(12) United States Patent
Yamauchi

(10) Patent No.: US 9,396,705 B2
(45) Date of Patent: Jul. 19, 2016

(54) IMAGE PROCESSING METHOD AND IMAGE PROCESSING APPARATUS FOR DRAWING GRAPHICS IN ONE AREA

(71) Applicant: SOCIONEXT INC., Yokohama-shi, Kanagawa (JP)

(72) Inventor: Hideaki Yamauchi, Kawasaki (JP)

(73) Assignee: SOCIONEXT INC., Yokohama (JP)

( * ) Notice: Subject to any disclaimer, the term of this patent is extended or adjusted under 35 U.S.C. 154(b) by 71 days.

(21) Appl. No.: 14/327,731

(22) Filed: Jul. 10, 2014

(65) Prior Publication Data

US 2015/0062136 A1 Mar. 5, 2015

(30) Foreign Application Priority Data

Aug. 30, 2013 (JP) ................. 2013-180636

(51) Int. Cl.
*G09G 5/36* (2006.01)
*G06T 11/20* (2006.01)

(52) U.S. Cl.
CPC ............... *G09G 5/363* (2013.01); *G06T 11/20* (2013.01)

(58) Field of Classification Search
CPC ....................................................... G06T 17/00
USPC ................................................. 345/420, 552
See application file for complete search history.

(56) References Cited

U.S. PATENT DOCUMENTS

| 7,502,510 B2 | 3/2009 | Miyoshi et al. |
| 8,427,493 B2 * | 4/2013 | Duluk, Jr. ............. G06F 9/3009 345/501 |
| 2008/0273030 A1 | 11/2008 | Kato et al. |
| 2012/0229834 A1 | 9/2012 | Nishikawa |
| 2013/0027397 A1 | 1/2013 | Sugama |

FOREIGN PATENT DOCUMENTS

| JP | 2005-84798 | 3/2005 |
| JP | 2012-185697 | 9/2012 |
| JP | 2013-030066 | 2/2013 |
| WO | WO 2006/073131 A1 | 7/2006 |

OTHER PUBLICATIONS

Patent Abstracts of Japan, Publication No. 2005-084798, published Mar. 31, 2005.

(Continued)

*Primary Examiner* — Zhengxi Liu
*Assistant Examiner* — Yanna Wu
(74) *Attorney, Agent, or Firm* — Staas & Halsey LLP

(57) ABSTRACT

An image processing method includes acquiring a drawing instruction for a graphic to be drawn and area information indicating a partitioned area in which at least a part of the graphic is drawn; classifying each partitioned area indicated by the area information such that partitioned areas in which the graphic at least a part of which is drawn is the same, are classified into a same group; correlating and storing to a first storage unit and for each classified group, the area information that indicates the partitioned areas classified into the group and the drawing instruction acquired for the graphic at least partially drawn in the partitioned areas classified into the group; and generating for each indicated partitioned area, image data indicating pixels within the partitioned area, based on the drawing instruction correlated with the area information indicating the partitioned area and stored in the first storage unit.

7 Claims, 31 Drawing Sheets

(56) References Cited

OTHER PUBLICATIONS

Espacenet—Bibliographic Data, Publication No. WO2006073131 (A1), published Jul. 13, 2006.

Patent Abstracts of Japan, Publication No. 2012-185697, published Sep. 27, 2012.
Patent Abstracts of Japan, Publication No. 2013-030066, published Feb. 7, 2013.

* cited by examiner

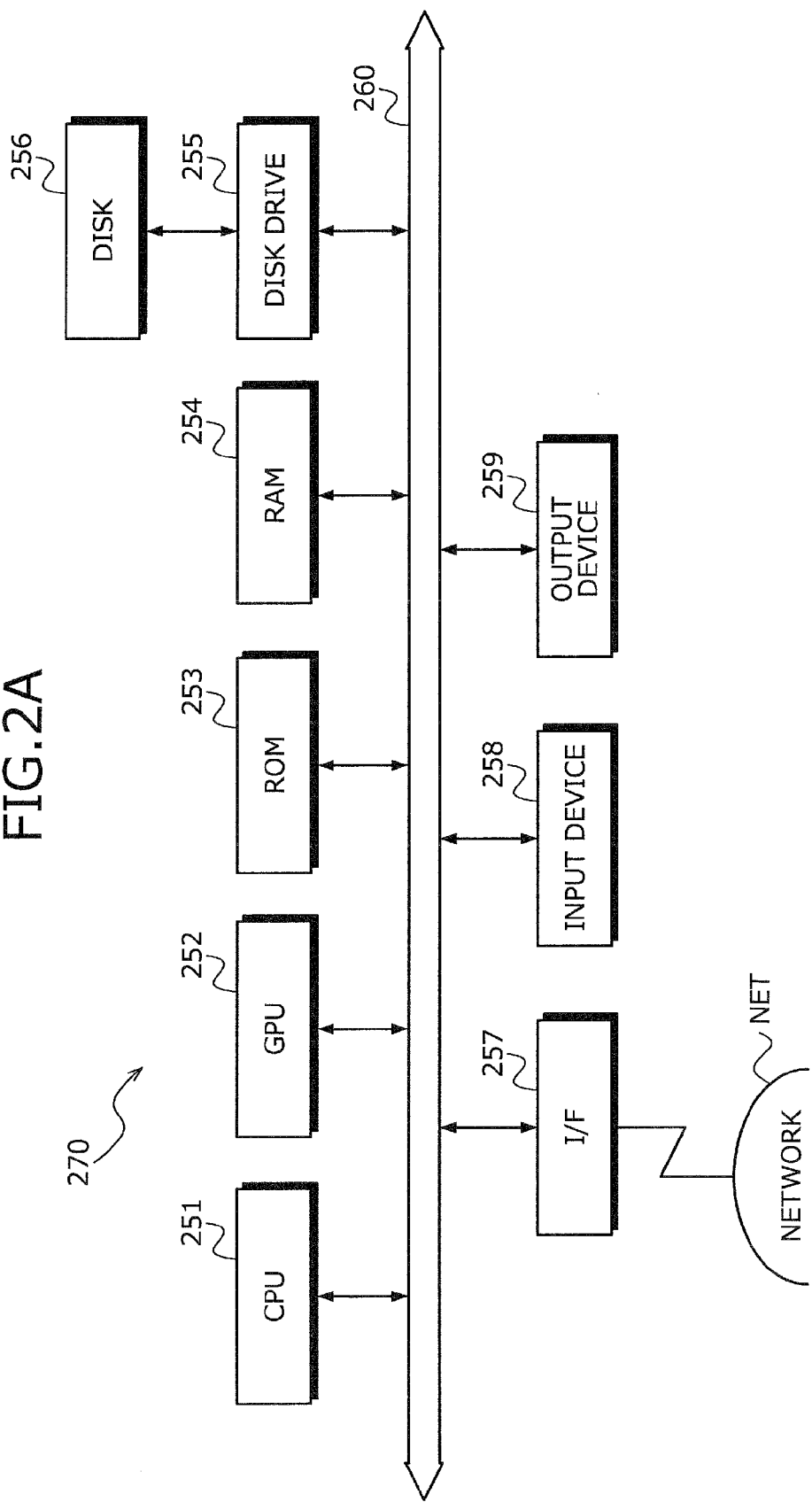

| VERTEX NUMBER | x | y | z | nx | ny | nz | s | t | |
|---|---|---|---|---|---|---|---|---|---|
| v0 | 12.5 | 9.1 | 2.3 | 0.92 | 0.85 | 0.11 | 0.0 | 0.0 | 401-1 |
| v1 | 8.7 | 6.8 | 1.4 | 0.83 | 0.49 | 0.32 | 0.16 | 0.02 | 401-2 |
| v2 | 7.2 | 5.7 | 1.1 | 0.71 | 0.53 | 0.56 | 0.38 | 0.12 | 401-3 |
| v3 | 3.4 | 1.2 | 18.1 | 0.32 | 0.86 | 0.79 | 0.49 | 1.33 | 401-4 |
| ... | ... | | | | | | | | |

FIG.5

| |
|---|
| GRAPHIC 1 DRAWING INSTRUCTION SET I1 |
| GRAPHIC 2 DRAWING INSTRUCTION SET I2 |
| GRAPHIC 3 DRAWING INSTRUCTION SET I3 |
| GRAPHIC 4 DRAWING INSTRUCTION SET I4 |
| GRAPHIC 5 DRAWING INSTRUCTION SET I5 |
| GRAPHIC 6 DRAWING INSTRUCTION SET I6 |
| GRAPHIC 7 DRAWING INSTRUCTION SET I7 |
| GRAPHIC 8 DRAWING INSTRUCTION SET I8 |
| ... |

FIG.6

| DRAWING RANGE NOTIFYING INSTRUCTION | Ls = 1 ; Lc = 2 |
|---|---|
| GRAPHIC 1 DRAWING INSTRUCTION SET I1 ||
| DRAWING RANGE NOTIFYING INSTRUCTION | Ls = 1 ; Lc = 5 |
| GRAPHIC 2 DRAWING INSTRUCTION SET I2 ||
| DRAWING RANGE NOTIFYING INSTRUCTION | Ls = 1 ; Lc = 2 |
| GRAPHIC 3 DRAWING INSTRUCTION SET I3 ||
| DRAWING RANGE NOTIFYING INSTRUCTION | Ls = 4 ; Lc = 4 |
| GRAPHIC 4 DRAWING INSTRUCTION SET I4 ||
| DRAWING RANGE NOTIFYING INSTRUCTION | Ls = 10 ; Lc = 2 |
| GRAPHIC 5 DRAWING INSTRUCTION SET I5 ||

...

| DRAWING RANGE NOTIFYING INSTRUCTION | Ls = 10 ; Lc = 2 |
|---|---|
| GRAPHIC 16 DRAWING INSTRUCTION SET I16 ||
| DRAWING RANGE NOTIFYING INSTRUCTION | Ls = 5 ; Lc = 7 |
| GRAPHIC 17 DRAWING INSTRUCTION SET I17 ||

FIG.7A

CONSECUTIVE COUNT BUFFER Lcb

| LINE SET INDEX i | 0 | 1 | 2 | 3 | 4 | 5 | 6 | 7 | 8 | 9 | 10 | 11 |
|---|---|---|---|---|---|---|---|---|---|---|---|---|
| CONSECUTIVE COUNT BUFFER Lcb[i] | Lcb[0] | Lcb[1] | Lcb[2] | Lcb[3] | Lcb[4] | Lcb[5] | Lcb[6] | Lcb[7] | Lcb[8] | Lcb[9] | Lcb[10] | Lcb[11] |

FIG.7B

START NUMBER BUFFER Lsb

| LINE SET INDEX i | 0 | 1 | 2 | 3 | 4 | 5 | 6 | 7 | 8 | 9 | 10 | 11 |
|---|---|---|---|---|---|---|---|---|---|---|---|---|
| START NUMBER BUFFER Lsb[i] | Lsb[0] | Lsb[1] | Lsb[2] | Lsb[3] | Lsb[4] | Lsb[5] | Lsb[6] | Lsb[7] | Lsb[8] | Lsb[9] | Lsb[10] | Lsb[11] |

FIG.8

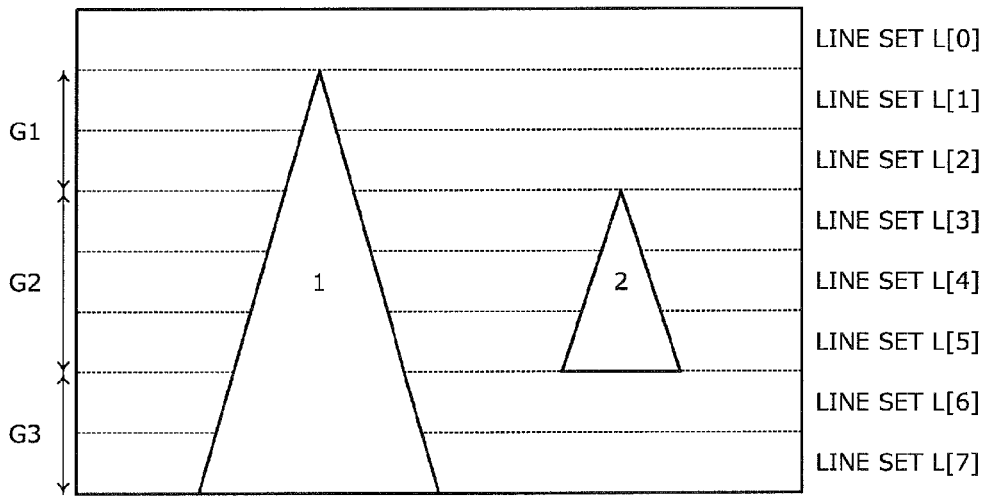

STEP S80:

| | [0] | [1] | [2] | [3] | [4] | [5] | [6] | [7] | |
|---|---|---|---|---|---|---|---|---|---|
| | 0 | 0 | 0 | 0 | 0 | 0 | 0 | 0 | START NUMBER BUFFER Lsb |
| | 0 | 0 | 0 | 0 | 0 | 0 | 0 | 0 | CONSECUTIVE COUNT BUFFER Lcb |

STEP S81:

| | [0] | [1] | [2] | [3] | [4] | [5] | [6] | [7] | |
|---|---|---|---|---|---|---|---|---|---|
| | 0 | 0 | 0 | 0 | 0 | 0 | 0 | 0 | START NUMBER BUFFER Lsb |
| | 0 | 7 | 6 | 5 | 4 | 3 | 2 | 1 | CONSECUTIVE COUNT BUFFER Lcb |

STEP S82:

| | [0] | [1] | [2] | [3] | [4] | [5] | [6] | [7] | |
|---|---|---|---|---|---|---|---|---|---|
| | 0 | 1 | 1 | 1 | 1 | 1 | 1 | 1 | START NUMBER BUFFER Lsb |
| | 0 | 7 | 6 | 5 | 4 | 3 | 2 | 1 | CONSECUTIVE COUNT BUFFER Lcb |

STEP S83:

| | [0] | [1] | [2] | [3] | [4] | [5] | [6] | [7] | |
|---|---|---|---|---|---|---|---|---|---|
| | 0 | 1 | 1 | 1 | 1 | 1 | 1 | 1 | START NUMBER BUFFER Lsb |
| | 0 | 7 | 6 | 3 | 2 | 1 | 2 | 1 | CONSECUTIVE COUNT BUFFER Lcb |

STEP S84:

| | [0] | [1] | [2] | [3] | [4] | [5] | [6] | [7] | |
|---|---|---|---|---|---|---|---|---|---|
| | 0 | 1 | 1 | 3 | 3 | 3 | 1 | 1 | START NUMBER BUFFER Lsb |
| | 0 | 7 | 6 | 3 | 2 | 1 | 2 | 1 | CONSECUTIVE COUNT BUFFER Lcb |

STEP S85:

| | [0] | [1] | [2] | [3] | [4] | [5] | [6] | [7] | |
|---|---|---|---|---|---|---|---|---|---|
| | 0 | 1 | 1 | 3 | 3 | 3 | 1 | 1 | START NUMBER BUFFER Lsb |
| | 0 | 2 | 1 | 3 | 2 | 1 | 2 | 1 | CONSECUTIVE COUNT BUFFER Lcb |

STEP S86:

| | [0] | [1] | [2] | [3] | [4] | [5] | [6] | [7] | |
|---|---|---|---|---|---|---|---|---|---|
| | 0 | 1 | 1 | 3 | 3 | 3 | 6 | 6 | START NUMBER BUFFER Lsb |
| | 0 | 2 | 1 | 3 | 2 | 1 | 2 | 1 | CONSECUTIVE COUNT BUFFER Lcb |

| STEP S90: | [0] | [1] | [2] | [3] | [4] | [5] | [6] | [7] | |
|---|---|---|---|---|---|---|---|---|---|
| | 0 | 0 | 0 | 0 | 0 | 0 | 0 | 0 | START NUMBER BUFFER Lsb |
| | 0 | 0 | 0 | 0 | 0 | 0 | 0 | 0 | CONSECUTIVE COUNT BUFFER Lcb |

| STEP S91: | [0] | [1] | [2] | [3] | [4] | [5] | [6] | [7] | |
|---|---|---|---|---|---|---|---|---|---|
| | 0 | 0 | 0 | 0 | 0 | 0 | 0 | 0 | START NUMBER BUFFER Lsb |
| | 0 | 0 | 0 | 3 | 2 | 1 | 0 | 0 | CONSECUTIVE COUNT BUFFER Lcb |

| STEP S92: | [0] | [1] | [2] | [3] | [4] | [5] | [6] | [7] | |
|---|---|---|---|---|---|---|---|---|---|
| | 0 | 0 | 0 | 3 | 3 | 3 | 0 | 0 | START NUMBER BUFFER Lsb |
| | 0 | 0 | 0 | 3 | 2 | 1 | 0 | 0 | CONSECUTIVE COUNT BUFFER Lcb |

| STEP S93: | [0] | [1] | [2] | [3] | [4] | [5] | [6] | [7] | |
|---|---|---|---|---|---|---|---|---|---|
| | 0 | 0 | 0 | 3 | 3 | 3 | 0 | 0 | START NUMBER BUFFER Lsb |
| | 0 | 2 | 1 | 3 | 2 | 1 | 1 | 0 | CONSECUTIVE COUNT BUFFER Lcb |

| STEP S94: | [0] | [1] | [2] | [3] | [4] | [5] | [6] | [7] | |
|---|---|---|---|---|---|---|---|---|---|
| | 0 | 1 | 1 | 3 | 3 | 3 | 6 | 0 | START NUMBER BUFFER Lsb |
| | 0 | 2 | 1 | 3 | 2 | 1 | 1 | 0 | CONSECUTIVE COUNT BUFFER Lcb |

FIG.10

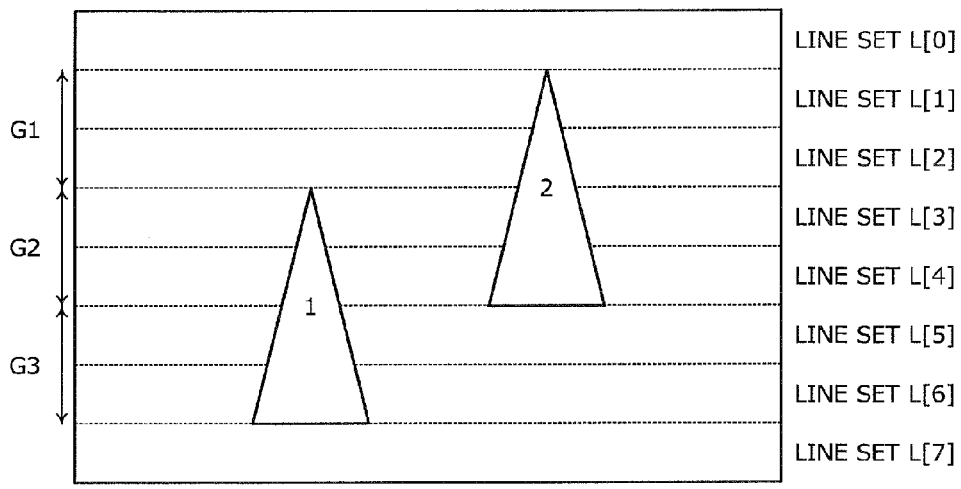

STEP S100:

| | [0] | [1] | [2] | [3] | [4] | [5] | [6] | [7] | |
|---|---|---|---|---|---|---|---|---|---|
| | 0 | 0 | 0 | 0 | 0 | 0 | 0 | 0 | START NUMBER BUFFER Lsb |
| | 0 | 0 | 0 | 0 | 0 | 0 | 0 | 0 | CONSECUTIVE COUNT BUFFER Lcb |

STEP S101:

| | [0] | [1] | [2] | [3] | [4] | [5] | [6] | [7] | |
|---|---|---|---|---|---|---|---|---|---|
| | 0 | 0 | 0 | 0 | 0 | 0 | 0 | 0 | START NUMBER BUFFER Lsb |
| | 0 | 0 | 0 | 4 | 3 | 2 | 1 | 0 | CONSECUTIVE COUNT BUFFER Lcb |

STEP S102:

| | [0] | [1] | [2] | [3] | [4] | [5] | [6] | [7] | |
|---|---|---|---|---|---|---|---|---|---|
| | 0 | 0 | 0 | 3 | 3 | 3 | 3 | 0 | START NUMBER BUFFER Lsb |
| | 0 | 0 | 0 | 4 | 3 | 2 | 1 | 0 | CONSECUTIVE COUNT BUFFER Lcb |

STEP S103:

| | [0] | [1] | [2] | [3] | [4] | [5] | [6] | [7] | |
|---|---|---|---|---|---|---|---|---|---|
| | 0 | 0 | 0 | 3 | 3 | 3 | 3 | 0 | START NUMBER BUFFER Lsb |
| | 0 | 2 | 1 | 2 | 1 | 2 | 1 | 0 | CONSECUTIVE COUNT BUFFER Lcb |

STEP S104:

| | [0] | [1] | [2] | [3] | [4] | [5] | [6] | [7] | |
|---|---|---|---|---|---|---|---|---|---|
| | 0 | 1 | 1 | 3 | 3 | 3 | 3 | 0 | START NUMBER BUFFER Lsb |
| | 0 | 2 | 1 | 2 | 1 | 2 | 1 | 0 | CONSECUTIVE COUNT BUFFER Lcb |

STEP S105:

| | [0] | [1] | [2] | [3] | [4] | [5] | [6] | [7] | |
|---|---|---|---|---|---|---|---|---|---|
| | 0 | 1 | 1 | 3 | 3 | 5 | 5 | 0 | START NUMBER BUFFER Lsb |
| | 0 | 2 | 1 | 2 | 1 | 2 | 1 | 0 | CONSECUTIVE COUNT BUFFER Lcb |

FIG.11

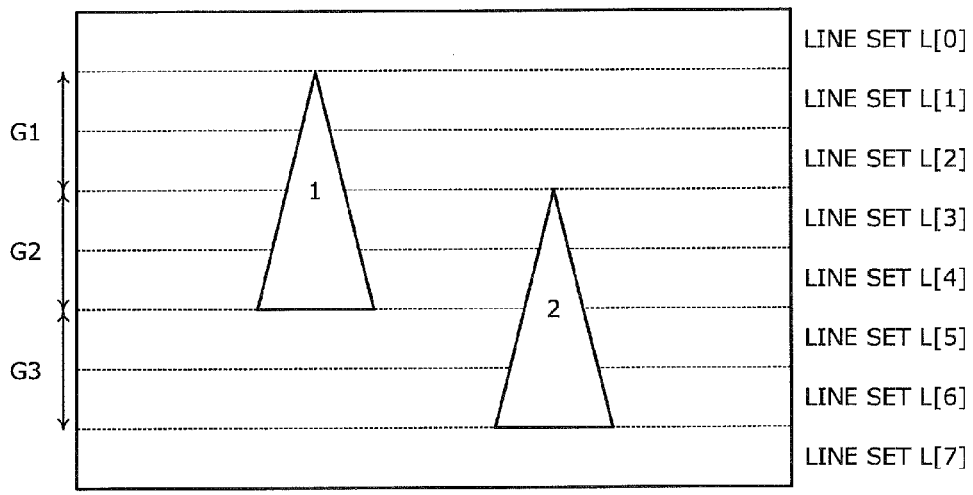

STEP S110:

| [0] | [1] | [2] | [3] | [4] | [5] | [6] | [7] | |
|---|---|---|---|---|---|---|---|---|
| 0 | 0 | 0 | 0 | 0 | 0 | 0 | 0 | START NUMBER BUFFER Lsb |
| 0 | 0 | 0 | 0 | 0 | 0 | 0 | 0 | CONSECUTIVE COUNT BUFFER Lcb |

STEP S111:

| [0] | [1] | [2] | [3] | [4] | [5] | [6] | [7] | |
|---|---|---|---|---|---|---|---|---|
| 0 | 0 | 0 | 0 | 0 | 0 | 0 | 0 | START NUMBER BUFFER Lsb |
| 0 | 4 | 3 | 2 | 1 | 0 | 0 | 0 | CONSECUTIVE COUNT BUFFER Lcb |

STEP S112:

| [0] | [1] | [2] | [3] | [4] | [5] | [6] | [7] | |
|---|---|---|---|---|---|---|---|---|
| 0 | 1 | 1 | 1 | 1 | 0 | 0 | 0 | START NUMBER BUFFER Lsb |
| 0 | 4 | 3 | 2 | 1 | 0 | 0 | 0 | CONSECUTIVE COUNT BUFFER Lcb |

STEP S113:

| [0] | [1] | [2] | [3] | [4] | [5] | [6] | [7] | |
|---|---|---|---|---|---|---|---|---|
| 0 | 1 | 1 | 1 | 1 | 0 | 0 | 0 | START NUMBER BUFFER Lsb |
| 0 | 4 | 3 | 2 | 1 | 2 | 1 | 0 | CONSECUTIVE COUNT BUFFER Lcb |

STEP S114:

| [0] | [1] | [2] | [3] | [4] | [5] | [6] | [7] | |
|---|---|---|---|---|---|---|---|---|
| 0 | 1 | 1 | 3 | 3 | 5 | 5 | 0 | START NUMBER BUFFER Lsb |
| 0 | 4 | 3 | 2 | 1 | 2 | 1 | 0 | CONSECUTIVE COUNT BUFFER Lcb |

STEP S115:

| [0] | [1] | [2] | [3] | [4] | [5] | [6] | [7] | |
|---|---|---|---|---|---|---|---|---|
| 0 | 1 | 1 | 3 | 3 | 5 | 5 | 0 | START NUMBER BUFFER Lsb |
| 0 | 2 | 1 | 2 | 1 | 2 | 1 | 0 | CONSECUTIVE COUNT BUFFER Lcb |

| | [0] | [1] | [2] | [3] | [4] | [5] | [6] | [7] | |
|---|---|---|---|---|---|---|---|---|---|
| STEP S120: | 0 | 0 | 0 | 0 | 0 | 0 | 0 | 0 | START NUMBER BUFFER Lsb |
| | 0 | 0 | 0 | 0 | 0 | 0 | 0 | 0 | CONSECUTIVE COUNT BUFFER Lcb |
| STEP S121: | 0 | 0 | 0 | 0 | 0 | 0 | 0 | 0 | START NUMBER BUFFER Lsb |
| | 3 | 2 | 1 | 0 | 0 | 0 | 0 | 0 | CONSECUTIVE COUNT BUFFER Lcb |
| STEP S122: | 0 | 0 | 0 | 0 | 0 | 0 | 0 | 0 | START NUMBER BUFFER Lsb |
| | 3 | 2 | 1 | 0 | 0 | 0 | 0 | 0 | CONSECUTIVE COUNT BUFFER Lcb |
| STEP S123: | 0 | 0 | 0 | 0 | 0 | 0 | 0 | 0 | START NUMBER BUFFER Lsb |
| | 3 | 2 | 1 | 0 | 4 | 3 | 2 | 1 | CONSECUTIVE COUNT BUFFER Lcb |
| STEP S124: | 0 | 0 | 0 | 0 | 4 | 4 | 4 | 4 | START NUMBER BUFFER Lsb |
| | 3 | 2 | 1 | 0 | 4 | 3 | 2 | 1 | CONSECUTIVE COUNT BUFFER Lcb |

FIG.13

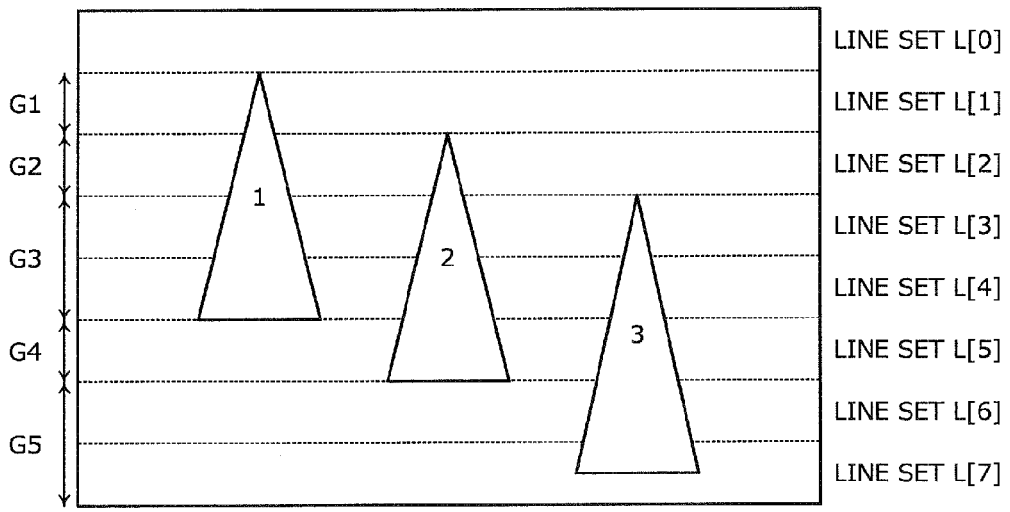

|  | [0] | [1] | [2] | [3] | [4] | [5] | [6] | [7] |  |
|---|---|---|---|---|---|---|---|---|---|
| STEP S130: STEP S131: STEP S132: | 0 | 1 | 1 | 1 | 1 | 0 | 0 | 0 | START NUMBER BUFFER Lsb |
| | 0 | 4 | 3 | 2 | 1 | 0 | 0 | 0 | CONSECUTIVE COUNT BUFFER Lcb |

|  | [0] | [1] | [2] | [3] | [4] | [5] | [6] | [7] |  |
|---|---|---|---|---|---|---|---|---|---|
| STEP S133: | 0 | 1 | 1 | 1 | 1 | 0 | 0 | 0 | START NUMBER BUFFER Lsb |
| | 0 | 4 | 3 | 2 | 1 | 1 | 0 | 0 | CONSECUTIVE COUNT BUFFER Lcb |

|  | [0] | [1] | [2] | [3] | [4] | [5] | [6] | [7] |  |
|---|---|---|---|---|---|---|---|---|---|
| STEP S134: | 0 | 1 | 2 | 2 | 2 | 5 | 0 | 0 | START NUMBER BUFFER Lsb |
| | 0 | 4 | 3 | 2 | 1 | 1 | 0 | 0 | CONSECUTIVE COUNT BUFFER Lcb |

|  | [0] | [1] | [2] | [3] | [4] | [5] | [6] | [7] |  |
|---|---|---|---|---|---|---|---|---|---|
| STEP S135: | 0 | 1 | 2 | 2 | 2 | 5 | 0 | 0 | START NUMBER BUFFER Lsb |
| | 0 | 1 | 3 | 2 | 1 | 1 | 0 | 0 | CONSECUTIVE COUNT BUFFER Lcb |

|  | [0] | [1] | [2] | [3] | [4] | [5] | [6] | [7] |  |
|---|---|---|---|---|---|---|---|---|---|
| STEP S136: | 0 | 1 | 2 | 2 | 2 | 5 | 0 | 0 | START NUMBER BUFFER Lsb |
| | 0 | 1 | 3 | 2 | 1 | 1 | 2 | 1 | CONSECUTIVE COUNT BUFFER Lcb |

|  | [0] | [1] | [2] | [3] | [4] | [5] | [6] | [7] |  |
|---|---|---|---|---|---|---|---|---|---|
| STEP S137: | 0 | 1 | 2 | 3 | 3 | 5 | 6 | 6 | START NUMBER BUFFER Lsb |
| | 0 | 1 | 3 | 2 | 1 | 1 | 2 | 1 | CONSECUTIVE COUNT BUFFER Lcb |

|  | [0] | [1] | [2] | [3] | [4] | [5] | [6] | [7] |  |
|---|---|---|---|---|---|---|---|---|---|
| STEP S138: | 0 | 1 | 2 | 3 | 3 | 5 | 6 | 6 | START NUMBER BUFFER Lsb |
| | 0 | 1 | 1 | 2 | 1 | 1 | 2 | 1 | CONSECUTIVE COUNT BUFFER Lcb |

FIG.14

STEP S1401. INITIALIZE BUFFER BY 0

| 0 | 1 | 2 | 3 | 4 | 5 | 6 | 7 | 8 | 9 | 10 | 11 | ←LINE SET INDEX |
|---|---|---|---|---|---|---|---|---|---|----|----|---|
| 0 | 0 | 0 | 0 | 0 | 0 | 0 | 0 | 0 | 0 | 0  | 0  | ←START NUMBER BUFFER Lsb |
| 0 | 0 | 0 | 0 | 0 | 0 | 0 | 0 | 0 | 0 | 0  | 0  | ←CONSECUTIVE COUNT BUFFER Lcb |

←GRAPHICS LINE SET CONSECUTIVE COUNT

STEP S1402. COMPARE CONSECUTIVE COUNTS OF GRAPHIC 1 AND Lcb

| 0 | 0 | 0 | 0 | 0 | 0 | 0 | 0 | 0 | 0 | 0 | 0 |
|---|---|---|---|---|---|---|---|---|---|---|---|
| 0 | 0 | 2 | 1 | 0 | 0 | 0 | 0 | 0 | 0 | 0 | 0 |

←LINE SET CONSECUTIVE COUNT OF GRAPHIC 1

STEP S1403. UPDATE Lcb

| 0 | 0 | 0 | 0 | 0 | 0 | 0 | 0 | 0 | 0 | 0 | 0 |
|---|---|---|---|---|---|---|---|---|---|---|---|
| 0 | 0 | 2 | 1 | 0 | 0 | 0 | 0 | 0 | 0 | 0 | 0 |

↑UPDATE ACCORDING TO PATH 3

STEP S1404. UPDATE Lsb

| 0 | 1 | 1 | 0 | 0 | 0 | 0 | 0 | 0 | 0 | 0 | 0 |
|---|---|---|---|---|---|---|---|---|---|---|---|
| 0 | 0 | 2 | 1 | 0 | 0 | 0 | 0 | 0 | 0 | 0 | 0 |

↑UPDATE ACCORDING TO PATH 9

STEP S1405. COMPARE CONSECUTIVE COUNTS OF GRAPHIC 2 AND Lcb

| 0 | 1 | 1 | 0 | 0 | 0 | 0 | 0 | 0 | 0 | 0 | 0 |
|---|---|---|---|---|---|---|---|---|---|---|---|
| 0 | 2 | 1 | 0 | 0 | 0 | 0 | 0 | 0 | 0 | 0 | 0 |
| 5 | 4 | 3 | 2 | 1 | | | | | | | |

←LINE SET CONSECUTIVE COUNT OF GRAPHIC 2

STEP S1406. UPDATE Lcb

| 0 | 1 | 1 | 0 | 0 | 0 | 0 | 0 | 0 | 0 | 0 | 0 |
|---|---|---|---|---|---|---|---|---|---|---|---|
| 0 | 2 | 1 | 3 | 2 | 1 | 0 | 0 | 0 | 0 | 0 | 0 |

↑UPDATE ACCORDING TO PATH 3
↑MAINTAIN ACCORDING TO PATH 2

STEP S1407. UPDATE Lsb

| 0 | 1 | 1 | 3 | 3 | 3 | 0 | 0 | 0 | 0 | 0 | 0 |
|---|---|---|---|---|---|---|---|---|---|---|---|
| 0 | 2 | 1 | 3 | 2 | 1 | 0 | 0 | 0 | 0 | 0 | 0 |

↑UPDATE ACCORDING TO PATH 8
↑UPDATE ACCORDING TO PATH 9

STEP S1408. COMPARE CONSECUTIVE COUNTS OF GRAPHIC 3 AND Lcb

| 0 | 1 | 1 | 3 | 3 | 3 | 0 | 0 | 0 | 0 | 0 | 0 |
|---|---|---|---|---|---|---|---|---|---|---|---|
| 0 | 2 | 1 | 3 | 2 | 1 | 0 | 0 | 0 | 0 | 0 | 0 |
| | | | | 2 | 1 | | | | | | |

←LINE SET CONSECUTIVE COUNT OF GRAPHIC 3

FIG.19

| LINE SET START INSTRUCTION | CONSECUTIVE COUNT 2 | LINE SET [1] |
|---|---|---|
| GRAPHIC 1 DRAWING INSTRUCTION SET I1 | | |
| GRAPHIC 2 DRAWING INSTRUCTION SET I2 | | |
| GRAPHIC 3 DRAWING INSTRUCTION SET I3 | | |
| LINE SET START INSTRUCTION | CONSECUTIVE COUNT 1 | LINE SET [3] |
| GRAPHIC 2 DRAWING INSTRUCTION SET I2 | | |
| LINE SET START INSTRUCTION | CONSECUTIVE COUNT 1 | LINE SET [4] |
| GRAPHIC 2 DRAWING INSTRUCTION SET I2 | | |
| GRAPHIC 4 DRAWING INSTRUCTION SET I4 | | |
| LINE SET START INSTRUCTION | CONSECUTIVE COUNT 1 | LINE SET [5] |
| GRAPHIC 2 DRAWING INSTRUCTION SET I2 | | |
| GRAPHIC 4 DRAWING INSTRUCTION SET I4 | | |
| GRAPHIC 17 DRAWING INSTRUCTION SET I17 | | |
| LINE SET START INSTRUCTION | CONSECUTIVE COUNT 2 | LINE SET [6] |
| GRAPHIC 4 DRAWING INSTRUCTION SET I4 | | |
| GRAPHIC 17 DRAWING INSTRUCTION SET I17 | | |
| LINE SET START INSTRUCTION | CONSECUTIVE COUNT 2 | LINE SET [8] |
| GRAPHIC 17 DRAWING INSTRUCTION SET I17 | | |
| LINE SET START INSTRUCTION | CONSECUTIVE COUNT 2 | LINE SET [10] |
| GRAPHIC 5 DRAWING INSTRUCTION SET I5 | | |
| ... | | |
| GRAPHIC 17 DRAWING INSTRUCTION SET I17 | | |

1900

IMAGE PROCESSING METHOD AND IMAGE PROCESSING APPARATUS FOR DRAWING GRAPHICS IN ONE AREA

CROSS REFERENCE TO RELATED APPLICATIONS

This application is based upon and claims the benefit of priority of the prior Japanese Patent Application No. 2013-180636, filed on Aug. 30, 2013, the entire contents of which are incorporated herein by reference.

FIELD

The embodiments discussed herein are related to an image processing method and an image processing apparatus.

BACKGROUND

Conventionally, in image processing, technologies are known such as a frame buffer method, a tiling method, and a line buffer method, respectively having differing batch drawing units (see, e.g., Japanese Laid-Open Patent Publication Nos. 2005-84798 and 2012-185697 and Published Japanese-Translation of PCT Application, Publication No. 2006/073131).

In image processing, a technology is known of outputting, for each partitioned area into which a display screen is divided, vertex and position information of a graphic to be drawn in the partitioned area and graphic information such as an equation of each side of the graphic, and generating image data of each pixel within the partitioned area (see, e.g., Japanese Laid-Open Patent Publication No. 2013-30066).

Nonetheless, storage of a drawing instruction for each partitioned area in a storage area arises in a problem in that the amount of data to be stored becomes large.

SUMMARY

According to an aspect of an embodiment, an image processing method executed by an image processing apparatus includes acquiring, for a graphic among a plurality of graphics to be drawn in a drawing area, a drawing instruction to draw the graphic in the drawing area and area information that indicates among a plurality of partitioned areas into which the drawing area is divided, a partitioned area in which at least a part of the graphic is drawn; classifying each partitioned area indicated by the acquired area information such that the partitioned areas in which, among the plurality of graphics, the graphic at least a part of which is drawn is the same, are classified into a same group; correlating and storing to a first storage unit and with respect to each classified group, the area information that indicates the partitioned areas classified into the group and the drawing instruction acquired for the graphic at least a part of which is drawn in the partitioned areas classified into the group; and generating for each partitioned area indicated by the acquired area information, image data that indicates each pixel within the partitioned area, based on the drawing instruction correlated with the area information indicating the partitioned area and stored in the first storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a block diagram of a hardware configuration example of a system using the image processing apparatus according to the embodiment;

FIG. 5 is an explanatory diagram of an example of a drawing instruction of each graphic;

FIG. 6 is an explanatory diagram of a pre-sort intermediate data example;

FIGS. 7A and 7B are explanatory diagrams of a consecutive count buffer Lcb example and a start number buffer Lsb example, respectively;

FIG. 8 is an explanatory diagram of updating example 1 of the consecutive count buffer Lcb and the start number buffer Lsb;

FIG. 10 is an explanatory diagram of updating example 3 of the consecutive count buffer Lcb and the start number buffer Lsb;

FIG. 11 is an explanatory diagram of updating example 4 of the consecutive count buffer Lcb and the start number buffer Lsb;

FIG. 13 is an explanatory diagram of updating example 6 of the consecutive count buffer Lcb and the start number buffer Lsb;

FIGS. 14, 15, and 16 are explanatory diagrams of an update transition example of the consecutive count buffer Lcb and the start number buffer Lsb related to graphic examples depicted in FIG. 3;

FIG. 19 is an explanatory diagram of a sorted intermediate data example related to the graphic example depicted in FIG. 3;

DESCRIPTION OF EMBODIMENTS

Embodiments of an image processing method and an image processing apparatus will be described in detail with reference to the accompanying drawings.

Figure 1:
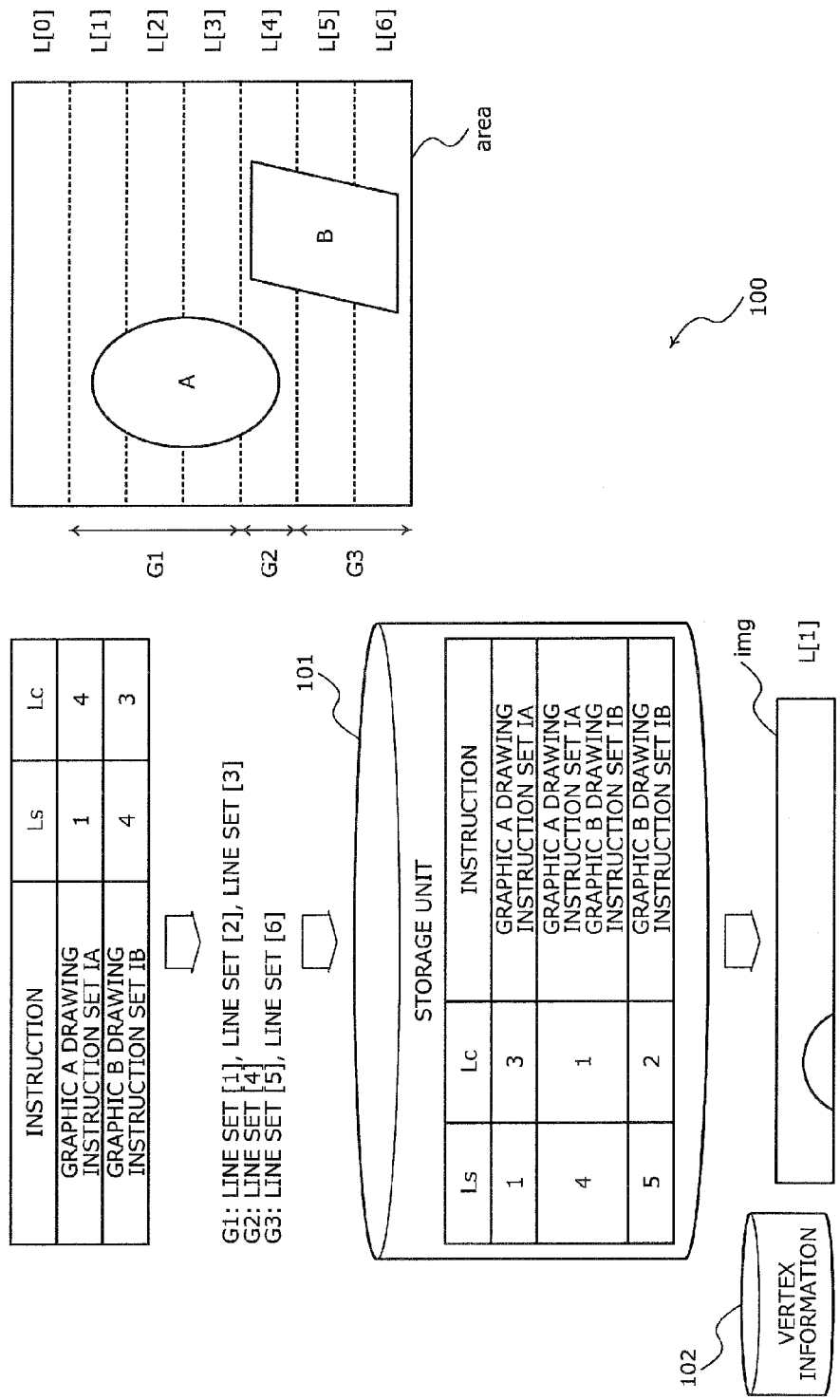
FIG. 1 is an explanatory diagram of an operation example of an image processing apparatus according to an embodiment.

FIG. 1 is an explanatory diagram of an operation example of an image processing apparatus according to an embodiment. An image processing apparatus 100 is an apparatus that generates image data_img for each pixel of a drawing area_area. The image processing apparatus 100 may be, for example, a specific apparatus such as a graphics processing unit (GPU) depicted in FIG. 2A or may be implemented by executing an image processing program on a central processing unit (CPU) depicted in FIG. 2A. The drawing area_area may be a display screen of a display, etc., for example.

The image processing apparatus 100 acquires, for each graphic, a drawing instruction I to draw the graphic in the drawing area_area and area information that indicates a partitioned area in which at least a part of the graphic is drawn, among plural partitioned areas into which the drawing area_area is divided. The plural graphics are drawn in the drawing area_area. In the example depicted in FIG. 1, graphic A and graphic B are drawn in the drawing area_area. The drawing instruction I is an instruction expressing preparation information to prepare the graphic as a numerical value or an equation and is, for example, an instruction described in a vector format. For example, when the drawing instruction I is executed, vertex data is acquired, based on the vertex described in the drawing instruction I, from vertex information 102 that indicates the vertex of each graphic. The vertex information 102 is stored, for example, in a storage device such as random access memory (RAM), read only memory (ROM), and a disk depicted in FIG. 2A. Alternatively, the vertex information 102 is stored in, for example, internal SRAM, etc., depicted in FIG. 2B. In the example depicted in FIG. 1, graphic A and graphic B are drawn in the drawing area_area. The partitioned area is referred to, for example, as line set L. The size of the line set L is, for example, the size of a line buffer. In FIG. 1, since the size along a horizontal direction of the drawing area_area is the size of the line buffer, the line set L is a partitioned area obtained by dividing the drawing area_area along a vertical direction. The area information is, for example, information that indicates among plural line sets L, a drawing range within which the graphic is drawn. The area information is stored in, for example, a storage device such as the RAM, the ROM, and the disk depicted in FIG. 2A. The information that indicates the drawing range has, for example, a line set start number Ls and a consecutive line set count Lc that is the number of line sets L in which at least a part of the graphic is drawn, from the line set start number Ls. The line set L number is, for example, a number given in order of drawing, from the top, along the vertical direction of the drawing area_area.

The image processing apparatus 100 then classifies the line sets L indicated by the acquired area information so that the line sets L in which, among plural graphics, the graphic at least a part of which is drawn is the same will belong to a same group. The image processing apparatus 100 classifies the line sets L so that the partitioned areas in which, among plural graphics, the graphic at least a part of which is drawn is the same and so that in image data_img generating processing, the partitioned areas for which the order of generation of the image data_img is consecutive will belong to a same group. In this embodiment, since the image data_img of each pixel of a line set L is generated for each line set L, an easier control can be achieved at the time of generating the image data_img by classifying adjacent line sets L into a same group. The order of generation is, for example, the order of drawing of the image data to the drawing area_area.

For example, the image processing apparatus 100 identifies the at least partially drawn graphic with respect to each of the line sets L, classifies the line sets L having same identification results into a same group, and classifies the line sets L for which the order of generation is consecutive into a same group. For example, if the size of the line set L is the size of the line buffer, then the line sets L for which the order of generation is consecutive are adjacent line sets L.

For example, graphic A is drawn in line set L[1] to line set L[4] and graphic B is drawn in line set L[4] to line set L[6]. Therefore, the image processing apparatus 100 classifies, for example, line set L[1] to line set L[3] into group G1 in which only graphic A is drawn. The image processing apparatus 100 classifies line set L[4] into group G2 in which graphic A and graphic B are drawn. The image processing apparatus 100 classifies line set L[5] and line set L[6] into group G3 in which only graphic B is drawn.

The image processing apparatus 100 correlates and stores to a storage unit 101, with respect to each of the groups, the area information that indicates the line sets L classified into the group and the drawing instruction I acquired with respect to the graphic at least a part of which is drawn in the line sets L classified into the group. The storage unit 101 is, for example, static random access memory (SRAM). For example, the storage unit 101 may be memory external to the image processing apparatus 100 or may be internal memory. When the storage unit 101 is external memory, the storage unit 101 is, for example, the RAM, etc., depicted in FIG. 2A. In the case of internal memory, the storage unit 101 is, for example, an internal SRAM, etc., depicted in FIG. 2B. For example, the area information that indicates the line sets L has, for example, the line set start number Ls, which is the number of the line set L at the top of the order of generation among the line sets L classified into the group, and the consecutive line set count Lc, which is the number of line sets L classified into the group.

For example, the image processing apparatus 100 correlates and stores to the storage unit 101, with respect to group G1, 1l as the line set start number Ls, 3 as the consecutive line set count Lc, and graphic A drawing instruction sets IA. For example, the image processing apparatus 100 correlates and stores to the storage unit 101, with respect to group G2, 4 as the line set start number Ls, 1 as the consecutive line set count Lc, and the graphic A drawing instruction sets IA and graphic B drawing instruction sets IB. For example, the image processing apparatus 100 correlates and stores to the storage unit 101, with respect to group G3, 5 as the line set start number Ls, 2 as the consecutive line set count Lc, and the graphic B drawing instruction sets IB.

The image processing apparatus 100 then with respect to each of the line sets L indicated by the acquired area information, generates the image data_img that indicates each pixel within the line set L, based on the drawing instruction I correlated with the area information indicated by the line set L and stored in the storage unit 101. For example, the image processing apparatus 100 selects the line sets L in numerical order. Each time the image processing apparatus 100 selects a line set L, the image processing apparatus 100 acquires the drawing instruction I stored in the storage unit 101, based on the number of the selected line set L. The image processing apparatus 100 generates pixel data of each pixel of the line set L by executing the acquired drawing instruction I. The generated pixel data is stored to, for example, the line buffer, etc.

Thus, by grouping the partitioned areas based on each combination of at least partially drawn graphics and by storing the drawing instruction I for each group, the drawing instructions to be stored for generation of the image data for each partitioned area can be reduced.

FIG. 2A is a block diagram of a hardware configuration example of a system using the image processing apparatus according to the embodiment. In FIG. 2A, a system 270 has a CPU 251, a GPU 252, a ROM 253, a RAM 254, a disk drive 255, and a disk 256. The system 270 has an I/F 257, an input device 258, and an output device 259. These units are interconnected by a bus 260.

The CPU 251 is in charge of overall control of the system 270. The GPU 252 is a unit specialized in the image processing. The ROM 253 stores programs such as a boot program. The RAM 254 is used as a work area of the CPU 251. The disk drive 255 controls the reading and writing of data with respect to the disk 256 under the control of the CPU 251. The disk 256 stores the data written under the control of the disk drive 255. The disk 256 may be, for example, a magnetic disk, an optical disk, etc.

The I/F 257 is connected through a communication line, to a network NET such as a local area network (LAN), a wide area network (WAN), and the Internet, and is connected to other apparatuses through the network NET. The I/F 257 administers an internal interface with the network NET and controls the input and output of data from external apparatuses. A modem, a LAN adapter, etc. may be employed as the I/F 257.

The input device 258 is an interface for the input of various data by a user operation of a keyboard, a mouse, a touch panel, etc. The input device 258 can further take in an image or a video from a camera as well as sound from a microphone. The output device 259 is an interface for the output of data in response to an instruction from the CPU 251 or the GPU 252. The output device 259 may be, for example, a display.

For example, when the image processing apparatus 100 is the GPU 252, the GPU 252 generates the image data to be displayed on the output device 259 in response to an instruction from the CPU 251.

Figure 2B:
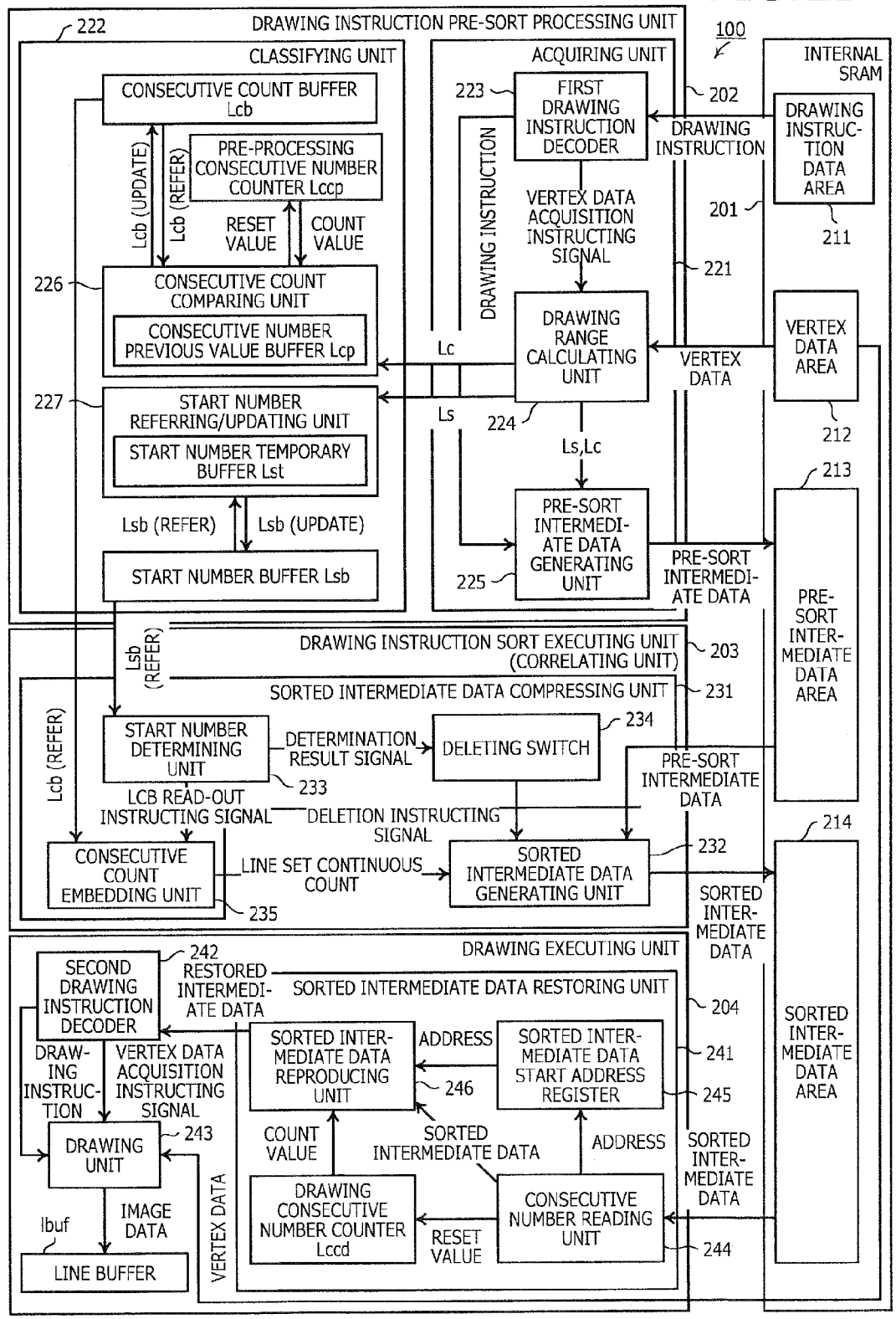
FIG. 2B is an explanatory diagram of a functional block example of the image processing apparatus according to the embodiment.

FIG. 2B is an explanatory diagram of a functional block example of the image processing apparatus according to the embodiment. The image processing apparatus 100 has a drawing instruction pre-sort processing unit 202, a drawing instruction sort executing unit 203, and a drawing executing unit 204. The image processing apparatus 100 may be, for example, the GPU 252 depicted in FIG. 2A. For example, when the image processing apparatus 100 is the GPU 252, each unit thereof may be formed by elements such as a logical AND circuit, a logical NOT circuit, a logical OR circuit, and a flip-flop (FF) as a latch circuit. Each unit may be implemented by an application specific integrated circuit (hereinafter referred to simply as "ASIC") such as a standard cell and a structured ASIC or by a programmable logic device (PLD) such as a field programmable gate array (EPGA). For example, each unit may be implemented by functionally defining the function of each unit in a netlist by a hardware description language, etc., logically synthesizing the netlist, and giving the netlist to the ASIC or the PLD.

The image processing apparatus 100 may be, for example, the CPU 251 depicted in FIG. 2A. For example, if the image processing apparatus 100 is the CPU 251, each unit may be coded into an image processing program stored in a storage device accessible by the image processing apparatus 100. Processes of each unit may be implemented by the image processing apparatus 100 reading out the image processing program and executing the processing coded in the image processing program.

The image processing apparatus 100 has internal SRAM 201 as a storage device. While the internal SRAM given here is specialized for storage of the drawing instructions I, the vertex data, pre-sort intermediate data, sorted intermediate data, etc., the storage device is not limited hereto and SRAM or a disk shared with other devices may be used.

The drawing instruction pre-sort processing unit 202 acquires with respect to each of plural graphics to be drawn in the drawing area_area, the drawing instruction I to draw a graphic and the vertex data that indicates the vertex of the graphic.

Figures 3, 4:
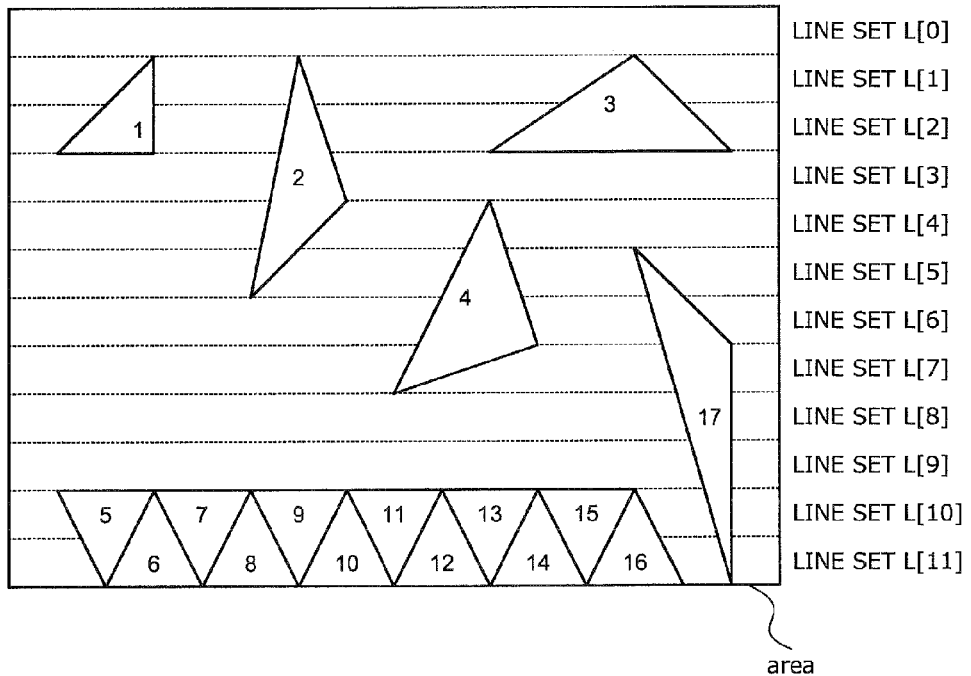
FIG. 3 is an explanatory diagram of an example of graphics to be drawn.
FIG. 4 is an explanatory diagram of a vertex information example.

FIG. 3 is an explanatory diagram of an example of graphics to be drawn. An example is given of drawing graphic 1 to graphic 17 in the drawing area_area.

FIG. 4 is an explanatory diagram of a vertex information example. The vertex information 102 is, for example, information that indicates the vertex for each vertex of the graphic to be displayed on the drawing screen. For example, a vertex data group has fields of vertex number, x, y, z, nx, ny, nz, s, and t for each vertex. With information set in each field, the table is stored as the vertex data (401-1 to 401-4, etc.) that indicate each vertex.

A three-dimensional orthogonal coordinate system is predefined that is composed of an x-axis, a y-axis, and a z-axis. Each coordinate value is set in the fields of x, y, and z. The information set in the fields of x, y, and z indicates the position of the vertex. A coordinate value of a normal vector is set in the fields of nx, ny, and nz. The information set in the fields of nx, ny, and nz indicates the position of the normal vector. A coordinate value of texture is set in the fields of s and t. The information set in the fields of s and t indicates the position of the texture. The vertex information 102 is stored in, for example, a vertex data area 212 within the internal SRAM 201. While the three-dimensional vertex data is given as an example, the vertex data may be two-dimensional.

FIG. 5 is an explanatory diagram of an example of the drawing instruction of each graphic. An acquiring unit 221 acquires for each graphic to be drawn in the drawing area_area, the drawing instruction I to draw a graphic in the drawing area_area, based on the vertex information. Each drawing instruction I is stored to, for example, a drawing instruction data area 211 within the internal SRAM 201.

For example, the acquiring unit 221 has a first drawing instruction decoder 223, a drawing range calculating unit 224, and a pre-sort intermediate data generating unit 225. For example, the first drawing instruction decoder 223 acquires a drawing instruction I by reading out a drawing instruction I to draw the graphic from the drawing instruction data area 211. The first drawing instruction decoder 223 decodes the acquired drawing instruction I and outputs a vertex data acquisition instructing signal to the drawing range calculating unit 224. The first drawing instruction decoder 223 acquires the drawing instructions I in units of the drawing instruction to draw one graphic.

The drawing range calculating unit 224 acquires the vertex data indicated by the vertex data acquisition instructing signal from the vertex data area 212. The drawing range calculating unit 224 calculates the vertex position on the drawing area_area, based on the acquired vertex data. At the time of calculating the vertex position, coordinate transformation is performed such as affine transformation by matrix multiplication but detailed description thereof is omitted. The drawing range calculating unit 224 calculates from which line set L to which line set L the graphic is drawn, based on the vertex position. By this, the drawing range calculating unit 224 calculates the information that indicates among plural line sets L, the line sets L in which the graphic is drawn. In the example depicted in FIG. 3, there are 12 line sets L including line set L[0] to line set L [11], obtained by dividing the drawing area_area along a predetermined direction. The horizontal size of the line set L is equivalent to a full size of the screen and the vertical size is one pixel to several pixels. As to the information that indicates the line sets L in which the graphic is drawn, for example, the line set start number Ls at which the graphic drawing is started and the consecutive line set count Lc from the line set start number Ls to the line set finish number at which the graphic drawing is finished are calculated.

The pre-sort intermediate data generating unit 225 generates pre-sort intermediate data, based on the drawing instruction I, the line set start number Ls, and the consecutive line set count Lc. For example, the pre-sort intermediate data generating unit 225 generates a drawing range notifying instruction with the line set start number Ls and the consecutive line set count Lc embedded therein. The pre-sort intermediate data generating unit 225 generates the pre-sort intermediate data by inserting the drawing range notifying instruction immediately before the drawing instruction I from the first drawing instruction decoder 223. The pre-sort intermediate data generating unit 225 writes the generated pre-sort intermediate data to a pre-sort intermediate data area 213 on the internal SRAM 201.

FIG. 6 is an explanatory diagram of a pre-sort intermediate data example. The pre-sort intermediate data has, for example, the drawing range notifying instruction with the line set start number Ls and the consecutive line set count Lc embedded therein, and the drawing instruction I, with respect to each of the graphics to be drawn.

A classifying unit 222 classifies the partitioned areas indicated by the acquired area information so that the partitioned areas in which, among plural graphics, the graphic at least a part of which is drawn is the same will belong to a same group. The classifying unit 222 further classifies the partitioned areas so that partitioned areas adjacent to each other in order of generation of the image data will belong to a same group. For example, in the case of performing display on a display, the order of generation of the image data is the order of displaying within one screen. In the example depicted in FIG. 6, the order of generation of the image data is the order of arrangement of the line sets L and is in the order from line set L[0] to line set L[11].

For example, the classifying unit 222 has a consecutive count buffer Lcb, a pre-processing consecutive number counter Lccp, a consecutive count comparing unit 226, a start number referring/updating unit 227, and a start number buffer Lsb.

FIGS. 7A and 7B are explanatory diagrams of a consecutive count buffer Lcb example and a start number buffer Lsb example, respectively. The consecutive count buffer Lcb is a buffer to hold the number of line sets L for which the same sorted intermediate data repeatedly appear, for each line set L. i is an index to specify the data storage position of the consecutive count buffer Lcb. The start number buffer Lsb is the line set number at which the same sorted intermediate data appears for the first time. i is an index to specify the data storage position of the start number buffer Lsb.

The consecutive line set count Lc and the line set start number Ls described above are information associated with the drawing instruction I for each graphic. In contrast, since it is possible that plural graphics are drawn at an arbitrary line set L, the consecutive count buffer Lcb and the start number buffer Lsb are information on the arrangement of the line sets L at which repeated drawing can be performed by a same drawing instruction set. The number of entries of each buffer is the number obtained by dividing the height of one frame by the height of a line buffer lbuf. For example, if the height of one frame is 480 pixels and the height of the line buffer lbuf is four pixels, then the number of entries is 120 and i is 0 to 119. As described above, in this embodiment, the number of entries is given as 12. By a combination of values of the start number buffer Lsb and the consecutive count buffer Lcb, the group of line sets L can be specified.

The consecutive count comparing unit 226 compares the drawing range of each graphic and corresponding values of the consecutive count buffer Lcb, at a drawing instruction I pre-sort processing stage. Depending on results of the comparison, the consecutive count comparing unit 226 holds an updated value or a set value of the consecutive count buffer Lcb. The consecutive count comparing unit 226 has a counter reset flag.

A consecutive number previous value buffer Lcp temporarily holds a pre-updating value of the consecutive count buffer Lcb, the pre-updating value is used as a comparison value of a condition determination.

The pre-processing consecutive number counter Lccp is a counter to calculate consecutive numbers for the line sets L, based on the results of the comparison by the consecutive count comparing unit 226.

The start number referring/updating unit 227 updates the start number buffer Lsb, based on the results of the comparison based on updated values of the consecutive count buffer Lcb.

A start number temporary buffer Lst is a buffer to temporarily hold pre-updating values of the start number buffer Lsb and the held values are used as comparison values of the condition determination.

For easier understanding, description will be made giving five updating examples of the start number buffer Lsb and the consecutive count buffer Lcb with respect to two graphics having varying overlapping of the drawing range and giving one updating example of the starting number buffer Lsb and the consecutive count buffer Lcb with respect to three graphics. These updating examples are for simplified description and detailed updating examples will be given in a flowchart to be described later.

FIG. 8 is an explanatory diagram of updating example 1 of the consecutive count buffer Lcb and the start number buffer Lsb. In updating example 1, the drawing range of graphic 1 is wider than that of graphic 2 and the drawing range of graphic 2 is included in that of graphic 1. The drawing range of graphic 1 is from line set L[1] to line set L[7]. The line set start number of graphic 1 is 1 and the consecutive line set count of graphic 1 is 7. The drawing range of graphic 2 is from line set L[3] to line set L[5]. The line set start number of graphic 2 is 3 and the consecutive line set count of graphic 2 is 3. The classifying unit 222 resets the values of the consecutive count buffer Lcb and the start number buffer Lsb to 0 (step S80).

The current value of the consecutive count buffer is the reset value of 0. Therefore, the consecutive count comparing unit 226 writes the values based on the line set start number Ls of graphic 1 and the consecutive line set count Lc of graphic 1, to [1] to [7] of the consecutive count buffer Lcb (step S81).

Since the line set start number of graphic 1 is 1, the start number referring/updating unit 227 writes the line set start number of graphic 1, to [1] to [7] of the start number buffer Lsb (step S82).

The line set start number Ls of graphic 2 is 3 and the consecutive line set count Lc is 3. Therefore, with respect to graphic 2, the consecutive count of line set L[3] is 3, the consecutive count of line set L[4] is 2, and the consecutive count of line set L[5] is 1. The consecutive count of a line set L with respect to graphic 2 is the number of line sets L from the number of the line set L to the line set ending number.

Current values of consecutive count buffer Lcb[3], [4], and [5] are 5, 4, and 3, respectively. Therefore, since the consecutive count of the line sets L with respect to graphic 2 is smaller than the current value of the corresponding consecutive count buffer Lcb, the consecutive count comparing unit 226, with respect to graphic 2, overwrites with the consecutive count of the line sets L (step S83).

Since the line set start number of graphic 2 is 3, the start number referring/updating unit 227 writes the line set start number of graphic 2 to [3] to [5] of the start number buffer Lsb (step S84).

With graphic 1, line sets L[1] to [7] were classified into one group, but with the addition of graphic 2, line sets L[1] to [7] are classified into three groups including line sets L[1] and [2], line sets L[3] to [5], and line sets L[6] and [7]. Therefore, the consecutive count comparing unit 226 updates consecutive count buffer Lcb[1] and [2] by optimum values and does not update consecutive count buffer Lcb[6] and [7] (step S85). The start number referring/updating unit 227 updates start number buffer Lsb[6] and [7] to 6 and does not update start number buffer Lsb[1] and [2] (step S86). Details of each step will be depicted in a flowchart.

According to the start number buffer Lsb and the consecutive count buffer Lcb at step S86, the line sets are classified into three groups G1 to G3 of line sets L[1] and [2], line sets L[3] to [5], and line sets L[6] and [7].

Figure 9:
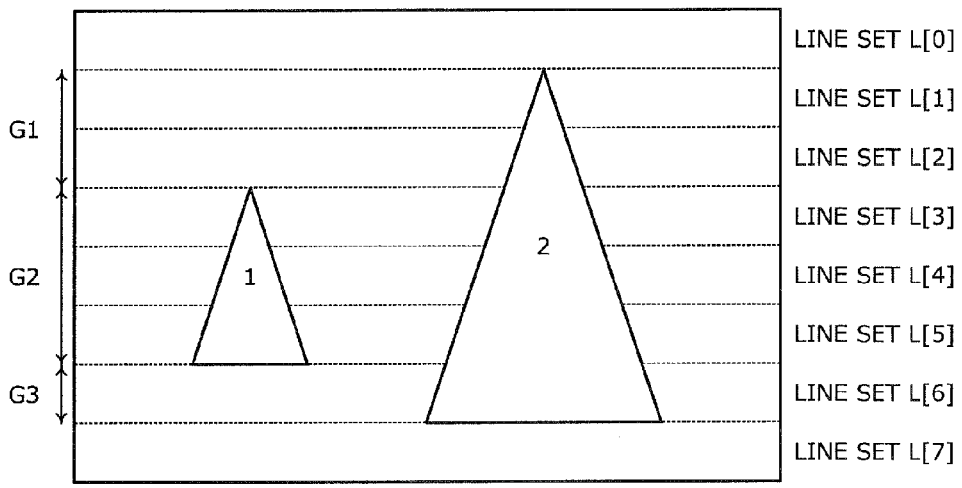
FIG. 9 is an explanatory diagram of updating example 2 of the consecutive count buffer Lcb and the start number buffer Lsb.

FIG. 9 is an explanatory diagram of updating example 2 of the consecutive count buffer Lcb and the start number buffer Lsb. In updating example 2, the drawing range of graphic 2 is wider than that of graphic 1 and the drawing range of graphic 1 is included in that of graphic 2. The drawing range of graphic 1 is from line set L[3] to line set L[5]. The line set start number of graphic 1 is 3 and the consecutive line set count of graphic 1 is 3. The drawing range of graphic 2 is from line set L[1] to line set L[6]. The line set start number of graphic 2 is 1 and the consecutive line set count of graphic 2 is 6. The classifying unit 222 resets the values of the consecutive count buffer Lcb and the start number buffer Lsb to 0 (step S90).

The current value of the consecutive count buffer is the reset value of 0. Therefore, the consecutive count comparing unit 226 writes the values based on the line set start number Ls of graphic 1 and the consecutive line set count Lc of graphic 1, to [3] to [5] of the consecutive count buffer Lcb (step S91).

Since the line set start number Ls of graphic 1 is 3, the start number referring/updating unit 227 writes the line set start number Ls of graphic 1, to [3] to [5] of the start number buffer Lsb (step S92).

The line set start number Ls of graphic 2 is 1 and the consecutive line set count Lc is 6. Therefore, with respect to graphic 2, the consecutive count of line set L[1] is 6 and, with the consecutive count monotonically decreasing in order of the line sets L, the consecutive count of line set L[6] is 1. Since the drawing range of graphic 2 is wider than the range of consecutive count buffer Lcb[3] to [5] in which current values are set, the drawing range of graphic 2 is divided into three groups by the drawing range of graphic 1. The consecutive count comparing unit 226 updates consecutive count buffer Lcb[1], [2], and [6] of the line sets L at which current values are not set and which are included in the drawing range of graphic 2 by the consecutive line set count, with respect to graphic 2, corrected by a divided length (step S93). The divided length is, for example, the number of line sets from the start position of drawing to the position immediately before starting of division. The divided length is, for example, the number of line sets from the start position of the division to the end position of the division. The divided length with respect to consecutive count buffer Lcb[1] and [2] is 2 and the divided length with respect to consecutive count buffer Lcb [6] is 1. The consecutive count 6 of line set L[1] with respect to graphic 2 is corrected as 2 and the consecutive count 5 of line set L[2] with respect to graphic 2 is corrected as 1. The consecutive count 1 of line set L[6] with respect to graphic 2 is corrected as 1.

The start number referring/updating unit 227 writes 1, 1, and 6 to start number buffer Lsb[1], [2], and [6], respectively, corresponding to line sets L[1], [2], and [6] that do not match the drawing range of graphic 1, among the drawing range of graphic 2 (step S94).

According to the start number buffer Lsb and the consecutive count buffer Lcb at step S94, the line sets are classified into three groups G1 to G3 of line sets L[1] and [2], line sets L[3] to [5], and line set L[6].

FIG. 10 is an explanatory diagram of updating example 3 of the consecutive count buffer Lcb and the start number buffer Lsb. In updating example 3, the consecutive count of graphic 1 and that of graphic 2 are the same, however, a portion of the drawing range of graphic 2 and a portion of that of graphic 1 overlap. The drawing range of graphic 1 is from line set L[3] to line set L[6]. The line set start number of graphic 1 is 3 and the consecutive line set count of graphic 1 is 4. The drawing range of graphic 2 is from line set L[1] to line set L[4]. The line set start number of graphic 2 is 1 and the consecutive line set count of graphic 2 is 4. The classifying unit 222 resets the values of the consecutive count buffer Lcb and the start number buffer Lsb to 0 (step S100).

The current value of the consecutive count buffer is the reset value of 0. Therefore, the consecutive count comparing unit 226 writes the values based on the line set start number Ls of graphic 1 and the consecutive line set count Lc of graphic 1, to [3] to [6] of the consecutive count buffer Lcb (step S101).

Since the line set start number Ls of graphic 1 is 3, the start number referring/updating unit 227 writes the line set start number Ls of graphic 1, to [3] to [6] of the start number buffer Lsb (step S102).

The line set start number Ls of graphic 2 is 1 and the consecutive line set count Lc of graphic 2 is 4. Therefore, with respect to graphic 2, the consecutive count of line set L[1] is 4 and, with the consecutive count monotonically decreasing in order of the line sets L, the consecutive count of line set L[4] is 1. Since the consecutive count of the line set L with respect to graphic 2 and consecutive count buffer Lcb[3] to [6] in which current values are set partially overlap, the drawing range of graphic 2 and the drawing range of graphic 1 are divided into two groups. The consecutive count comparing unit 226 updates consecutive count buffer Lcb[1] and [2] and consecutive count buffer Lcb[3] and [4] by the consecutive line set count, with respect to graphic 2, corrected by the divided length (step S103). The consecutive count 4 of line set L[1] concerning graphic 2 is corrected to 2 and the consecutive count 3 of line set L[2] concerning graphic 2 is corrected to 1. The consecutive count 2 of line set L[3] concerning graphic 2 is corrected to 2 and the consecutive count 1 of line set L[4] concerning graphic 2 is corrected to 1.

Since the start number Ls of graphic 2 is 1 and the current consecutive count buffer Lcb[1] is 2, the start number referring/updating unit 227 writes 1 as the start number Ls of graphic 2, to start number buffer Lsb[1] and [2] (step S104).

Since an optimum value is set in start number buffer Lsb[3] and [4] corresponding to line sets L[3] and [4], the start number referring/updating unit 227 does not update start number buffer Lsb[3] and [4].

The start number referring/updating unit 227 updates start number buffer Lsb[5] and [6] corresponding to line sets L[5] and [6] in which only graphic 1 is drawn by the optimum value 5 (step S105).

According to the start number buffer Lsb and the consecutive count buffer Lcb at step S105, the line sets are classified into three groups G1 to G3 of line sets L[1] and [2], line sets L[3] and [4], and line sets L[5] and [6].

FIG. 11 is an explanatory diagram of updating example 4 of the consecutive count buffer Lcb and the start number buffer Lsb. In updating example 4, the consecutive count of graphic 1 and that of graphic 2 are the same, however, a portion of the drawing range of graphic 2 and a portion of that of graphic 1 overlap. The drawing range of graphic 1 is from line set L[1] to line set L[4]. The line set start number of graphic 1 is 1 and the consecutive line set count of graphic 1 is 4. The drawing range of graphic 2 is from line set L[3] to line set L[6]. The line set start number of graphic 2 is 3 and the consecutive line set count of graphic 2 is 4. The classifying unit 222 resets the values of the consecutive count buffer Lcb and the start number buffer Lsb to 0 (step S110).

The current value of the consecutive count buffer is the reset value of 0. Therefore, the consecutive count comparing unit 226 writes the values based on the line set start number Ls of graphic 1 and the consecutive line set count Lc of graphic 1, to [1] to [4] of the consecutive count buffer Lcb (step S111).

Since the line set start number Ls of graphic 1 is 1, the start number referring/updating unit 227 writes the line set start number Ls of graphic 1, to [1] to [4] of the start number buffer Lsb (step S112).

The line set start number Ls of graphic 2 is 3 and the consecutive line set count Lc of graphic 2 is 4. Therefore, with respect to graphic 2, the consecutive count of line set L[3] is 4 and, with the consecutive count monotonically decreasing in order of the line sets L, the consecutive count of line set L[6] is 1. Since the consecutive count of the line sets L with respect to graphic 2 and consecutive count buffer Lcb[1] to [4] in which values are set partially overlap, the drawing range of graphic 2 and the drawing range of graphic 1 are divided into two groups. The consecutive count comparing unit 226 updates consecutive count buffer Lcb[5] and [6] by the consecutive line set count, with respect to graphic 2, corrected by the divided length (step S113). The consecutive count 2 of line set L[5] concerning graphic 2 is corrected to 2 and the consecutive count 1 of line set L[6] concerning graphic 2 is corrected to 1. The consecutive count 4 of line set L[3] concerning graphic 2 is corrected to 1 and the consecutive count 3 of line set L[4] concerning graphic 2 is corrected to 1. For corrected values that are the same as the current values set in the consecutive count buffer Lcb, the corresponding current value is not updated.

The start number of line sets L[3] and [4] in which both graphic 2 and graphic 1 are drawn is 3 and the start number of line sets L[5] and [6] in which only graph 2 is drawn is 5. Therefore, the start number referring/updating unit 227 writes the start number 3 to start number buffer Lsb[3] and [4] and writes the start number 5 to start number buffer Lsb[5] and [6] (step S114).

The consecutive count comparing unit 226 updates by optimum values of 2 and 1, respectively, consecutive count buffer Lcb[1] and [2] updated by the consecutive line set count Lc of graphic 1 (step S115).

According to the start number buffer Lsb and the consecutive count buffer Lcb at step S115, the line sets are classified into three groups G1 to G3 of line sets L[1] and [2], line sets L[3] and [4], and line sets L[5] and [6].

Figure 12:
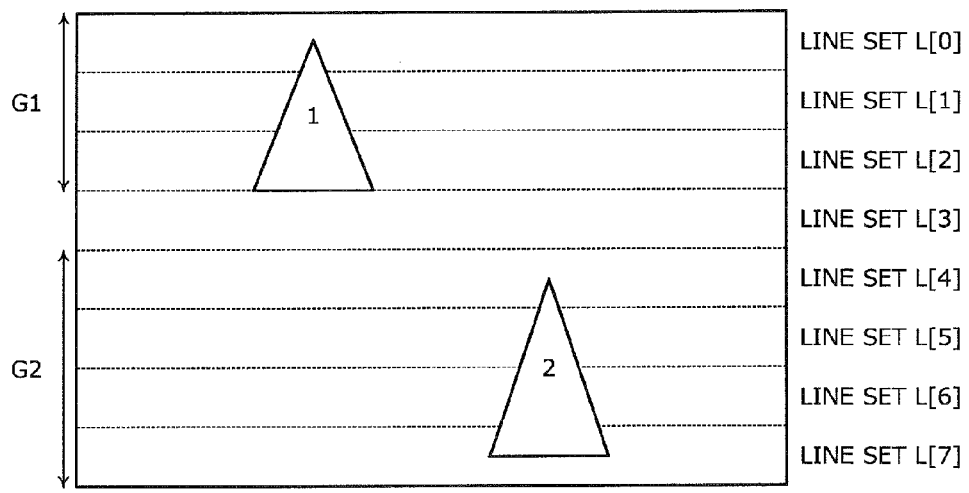
FIG. 12 is an explanatory diagram of updating example 5 of the consecutive count buffer Lcb and the start number buffer Lsb.

FIG. 12 is an explanatory diagram of updating example 5 of the consecutive count buffer Lcb and the start number buffer Lsb. In updating example 5, the drawing range of graphic 2 and that of graphic 1 do not overlap. The drawing range of graphic 1 is from line set L[0] to line set L[2]. The line set start number of graphic 1 is 0 and the consecutive line set count of graphic 1 is 3. The drawing range of graphic 2 is from line set L[4] to line set L[7]. The line set start number of graphic 2 is 4 and the consecutive line set count of graphic 2 is 4. The classifying unit 222 resets the values of the consecutive count buffer Lcb and the start number buffer Lsb to 0 (step S120).

The current value of the consecutive count buffer is the reset value of 0. Therefore, the consecutive count comparing unit 226 writes the values based on the line set start number Ls of graphic 1 and the consecutive line set count Lc of graphic 1, to [0] to [2] of the consecutive count buffer Lcb (step S121).

Since the line set start number Ls of graphic 1 is 0, the start number referring/updating unit 227 writes the line set start number Ls of graphic 1, to [0] to [2] of the start number buffer Lsb (step S122).

The line set start number Ls of graphic 2 is 4 and the consecutive line set count Lc of graphic 2 is 4. Therefore, with respect to graphic 2, the consecutive count of line set L[4] is 4 and, with the consecutive count monotonically decreasing in order of the line sets L, the consecutive count of line set L[7] is 1. Since the consecutive count of the line sets L with respect to graphic 2 and consecutive count buffer Lcb[0] to [3] in which values are set do not overlap, the consecutive count comparing unit 226 set values in consecutive count buffer Lcb[4] to [7] based on the line set start number Ls and the consecutive line set counts for graphic 2 (step S123).

Since the line set start number Ls of graphic 2 is 4, the start number referring/updating unit 227 writes the line set start number Ls of graphic 2 to start number buffer Lsb[4] to [7] (step S124).

According to the start number buffer Lsb and the consecutive count buffer Lcb at step S124, the line sets are classified into two groups G1 and G2 of line sets L[0] to [2], and line sets L[3] to [7].

FIG. 13 is an explanatory diagram of updating example 6 of the consecutive count buffer Lcb and the start number buffer Lsb. In updating example 6, graphic 1, graphic 2, and graphic 3 partially overlap one another. Since steps S130 to S132 are same processing as that of updating examples 1 to 5, description thereof is omitted.

The drawing range of graphic 2 is line sets L[2] to [5]. The consecutive count of line set L[2] of graphic 2 is 4 and, with the consecutive count monotonically decreasing in order of the line set L, the consecutive count of line set L[5] is 1. Since the consecutive count of the line sets L of graphic 2 and consecutive count buffer Lcb[1] to [4] in which values are set partially overlap, the drawing range of graphic 2 and the drawing range of graphic 1 are divided into two groups. The consecutive count comparing unit 226 updates consecutive count buffer Lcb[5] by the consecutive line set count, with respect to graphic 2, corrected by the divided length (step S133). The consecutive count 3 of line set L[2] concerning graphic 2 is corrected to 3 and the consecutive count 2 of line set L[3] concerning graphic 2 is corrected to 2. The consecutive count 1 of line set L[4] concerning graphic 2 is corrected to 1 and the consecutive count 0 of line set L[5] concerning graphic 2 is corrected to 1. Therefore, since the consecutive counts corrected for line sets L[2] to [4] are the same as the values set in consecutive count buffer Lcb[2] to [4], these set values are not updated.

The start number of line sets L[2] to [4] in which both graphic 2 and graphic 1 are drawn is 2 and the start number of line set L[5] in which graphic 1 is not drawn and in which graphic 2 is drawn is 5. Therefore, the start number referring/updating unit 227 writes 2 to start number buffer Lsb[2] to [4] and writes 5 to start number buffer Lsb[5] (step S134).

The consecutive count of line set L[1] in which graphic 2 is not drawn and in which graphic 1 is drawn is not 4 because of line sets L[2] to [4] in which graphic 2 and graphic 1 are drawn. Therefore, the start number referring/updating unit 227 updates consecutive count buffer Lcb[1] updated by the consecutive line set count Lc of graphic 1 by the optimum value 1 (step S135).

The drawing range of graphic 3 is line sets L[3] to [7]. With respect to graphic 3, the consecutive count of line set L[3] is 5 and, with the consecutive count monotonically decreasing in order of the line set L, the consecutive count of line set L[7] is 1. Therefore, the three groups of line set L[1], line sets L[2] to [4], and line set L[5] are further classified into different groups by addition of graphic 3. The consecutive count comparing unit 226 updates consecutive count buffer Lcb[6] and [7] by the consecutive line set count Lc of graphic 3, corrected by the divided length (step S136). However, since optimum values remain in consecutive count buffer Lcb[3] to [5], the consecutive count comparing unit 226 does not update consecutive count buffer Lcb[3] to [5].

The line set start number of line sets L[3] and [4] in which three graphics of graphic 1, graphic 2, and graphic 3 overlap is 3 and the line set start number of line sets L[6] and [7] in which only a part of graphic 3 is drawn is 6. Therefore, the start number referring/updating unit 227 writes 3 to start number buffer Lsb[3] and [4] and writes 6 to start number buffer Lsb[6] and [7] (step S137). However, since the optimum value remains in start number buffer Lsb[5], the start number referring/updating unit 227 does not update start number buffer Lsb[5].

Since line set L[2] and line sets L[3] and [4] are classified into different groups, the consecutive count comparing unit 226 updates consecutive count buffer Lcb[2] by the optimum value (step S138). However, since the optimum value remains in start number buffer Lsb[2] of line set L[2], the start number referring/updating unit 227 does not update start number buffer Lsb[2].

According to the start number buffer Lsb and the consecutive count buffer Lcb at step S138, the line sets L are classified into five groups of G1 to G5. Groups G1 to G5 are line set L[1], line set L[2], line sets L[3] and [4], line set L[5], and line sets L[6] and [7], respectively.

The determined values of start number buffer Lsb have the following characteristics. The values of the start number buffer Lsb corresponding to the line sets L in which the combination of graphics is the same are the same start number. In the combination of graphics as used here, even if there is only a single graphic at least a part of which is drawn in the line sets L, the single graphic is treated as one combination of graphics. Among the line sets L in which the combination of graphics is the same, the number of the line set L at the top in order of generation and the value of the start number buffer Lsb corresponding to such line set L match.

The determined values of the consecutive count buffer Lcb have the following characteristics. For example, a value of 0 in the consecutive count buffer Lcb corresponding to the line set L indicates that there is no graphic to be drawn at the line set L. For example, when the value of the consecutive count buffer Lcb corresponding to the line set L is 1, the characteristics have the following two patterns. When the value of the consecutive count buffer Lcb corresponding to the line set L immediately before in the order of generation is 1 or 0, the corresponding line set L is a line set L for which no adjacent line set L has the same combination of graphics as the corresponding line set L. Namely, it indicates that there is no other line set L classified into the same group. A value of 2 in the consecutive count buffer Lcb corresponding to the line set L immediately before in the order of generation indicates a line set L that is rearmost in the order of generation among the line sets L in which the combination of graphics is the same. Namely, it indicates the line set L rearmost in the order of generation among the line sets L classified into the same group.

For example, when the value of the continuous line buffer Lcb corresponding to the line set L is greater than 1, the characteristics have the following two patterns. A value of 1 or 0 in the consecutive count buffer Lcb corresponding to the line set L immediately before in the order of generation indicates a line set L at the top in the order of generation, among the line sets L in which the combination of graphics is the same. Namely, such a value indicates the line set L at the top in the order of generation, among the line sets L classified into the same group. When the value of the consecutive count buffer Lcb corresponding to the line set L immediately before in the order of generation is greater by 1 than the value of the consecutive count buffer Lcb corresponding to a current given line set L, the current given line set L is as follows. The current given line set L is indicated to be a line set L that is not at the top or rearmost in order of generation, among the line sets L in which the combination of graphics is the same.

Figure 15:
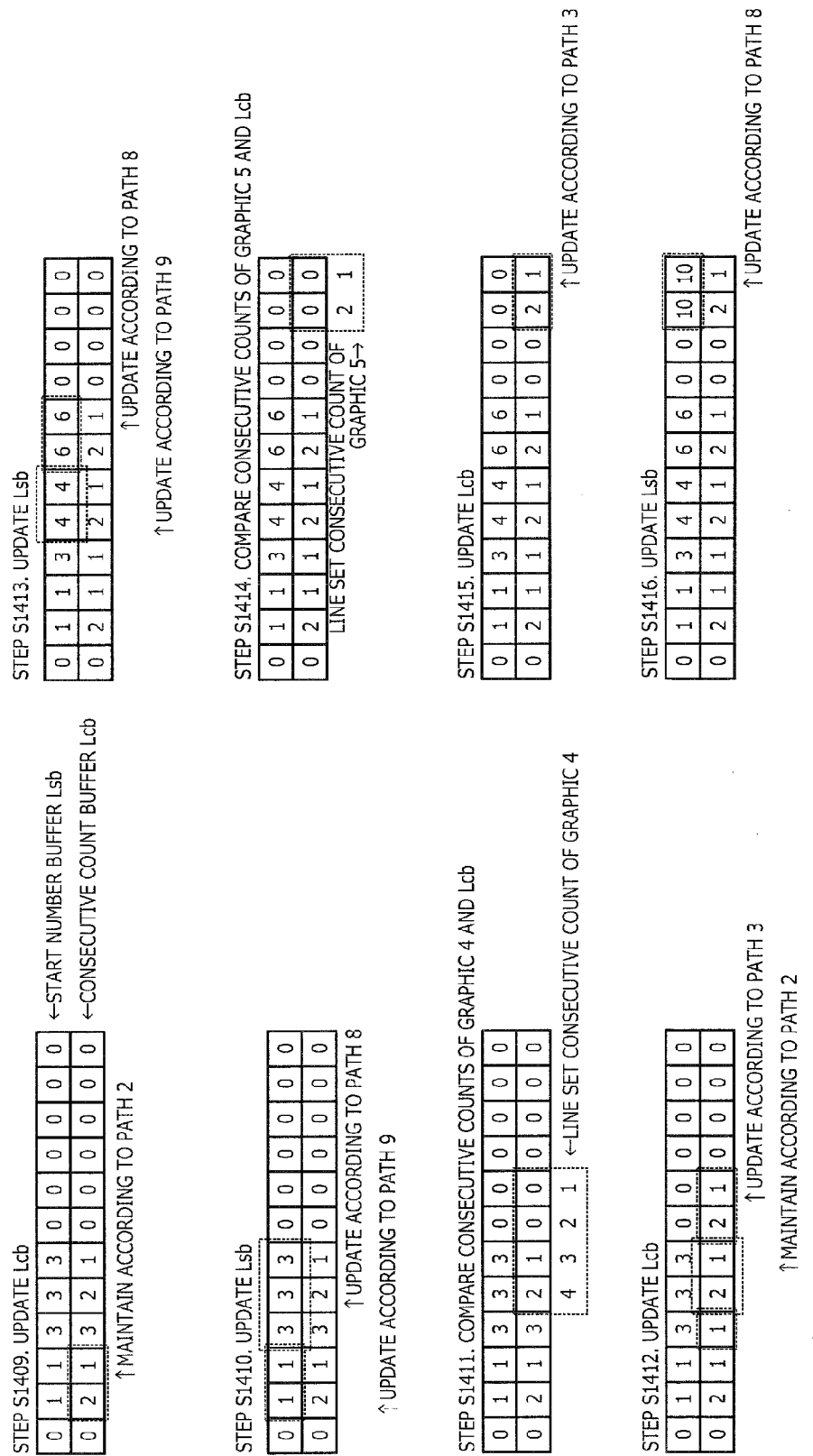
Figure 16:
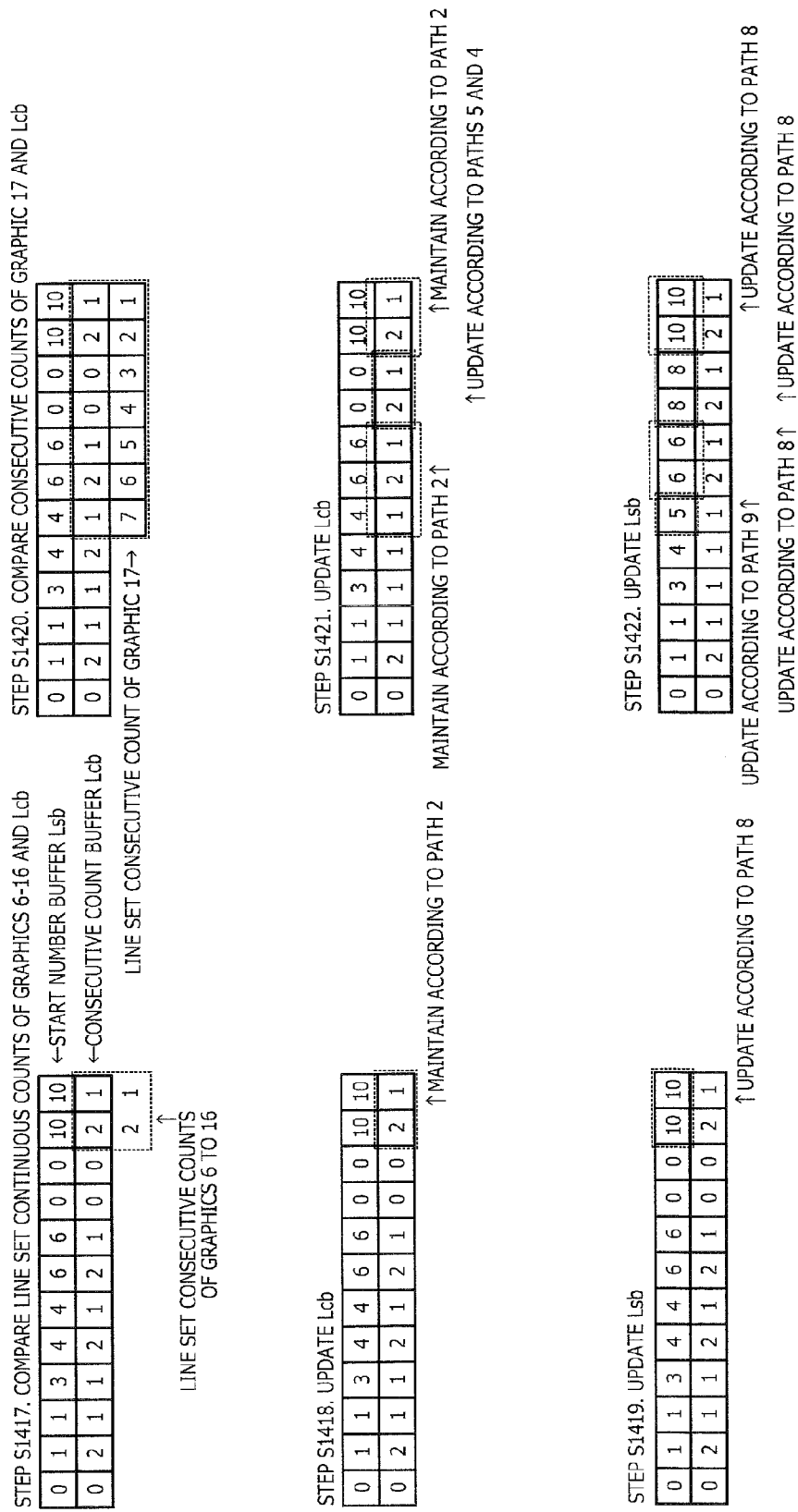

FIGS. 14, 15, and 16 are explanatory diagrams of an update transition example of the consecutive count buffer Lcb and the start number buffer Lsb related to the graphic examples depicted in in FIG. 3. A path in FIGS. 14 to 16 is a path of steps described in the flowchart to be described later.

The classifying unit 222 initializes each buffer element to 0 (step S1401). The classifying unit 222 compares the consecutive line set count of graphic 1 and the consecutive count buffer Lcb (step S1402). The classifying unit 222 updates the consecutive count buffer Lcb, based on results of the comparison (step S1403). Consecutive count buffer Lcb[1] and [2] are updated according to path 3. The classifying unit 222 updates the start number buffer Lsb with respect to graphic 1 (step S1404). Start number buffer Lsb[1] and [2] are updated according to path 9.

The classifying unit 222 compares the consecutive line set count Lc of graphic 2 and the consecutive count buffer Lcb (step S1405). The classifying unit 222 updates the consecutive count buffer Lcb, based on results of the comparison. The classifying unit 222 maintains consecutive count buffer Lcb [1] and [2] according to path 2 and updates consecutive count buffer Lcb[3] to [5] according to path 3 (step S1406). In consecutive count buffer Lcb[1] and [2], since the updated value and the current value are the same, the current value is maintained.

The classifying unit 222 updates start number buffer Lsb [1] and [2] according to path 9 and updates start number buffer Lsb[3] to [5] according to path 8 (step S1407). The classifying unit 222 compares the consecutive line set count Lc of graphic 3 and the consecutive count buffer Lcb (step S1408). The classifying unit 222 maintains consecutive count buffer Lcb[1] and [2] according to path 2, based on results of the comparison (step S1409). Consecutive count buffer Lcb [1] and [2] are maintained. The classifying unit 222 updates start number buffer Lsb[1] and [2] according to path 9 and updates start number buffer Lsb[3] to [5] according to path 8 (step S1410).

The classifying unit 222 then compares the consecutive line set count Ls of graphic 4 and the consecutive count buffer Lcb (step S1411). The classifying unit 222 updates consecutive count buffer Lcb[3] according to path 7, based on results of the comparison. The classifying unit 222 maintains consecutive count buffer Lcb[4] and [5] according to path 2 and updates consecutive count buffer Lcb[6] and [7] according to path 3 (step S1412).

The classifying unit 222 updates start number buffer Lsb[4] and [5] according to path 9 and updates start number buffer Lsb[6] and [7] according to path 8 (step S1413). The classifying unit 222 compares the consecutive line set count Lc of graphic 5 and the consecutive count buffer Lcb (step S1414). The classifying unit 222 updates consecutive count buffer Lcb[10] and [11] according to path 3, based on results of the comparison (step S1415). The classifying unit 222 updates start number buffer Lsb[10] and [11] according to path 8 (step S1416).

The classifying unit 222 compares the consecutive line set count Lc of each graphic 6 to 16 and the consecutive count buffer Lcb (step S1417). The classifying unit 222 maintains consecutive count buffer Lcb[10] and [11] according to path 2, based on results of the comparison (step S1418). The classifying unit 222 updates start number buffer Lsb[10] and [11] according to path 8 (step S1419).

The classifying unit 222 compares the consecutive line set count Lc of graphic 17 and the consecutive count buffer Lcb (step S1420). The classifying unit 222 maintains consecutive count buffer Lcb[5] to [7] according to path 2, based on results of the comparison. Further, the classifying unit 222 updates consecutive count buffer Lcb[8] and [9] according to path 5 and path 4 and maintains consecutive count buffer Lcb[10] and [11] according to path 2 (step S1421). The classifying unit 222 updates start number buffer Lsb[5] according to path 9 and updates start number buffer Lsb[6] to [11] according to path 8 (step S1422).

The drawing instruction sort executing unit 203 is a correlating unit that correlates and stores to a storage unit, the area information and the drawing instruction I, for each of the groups. The area information as used herein indicates the line sets L classified into a group. The drawing instruction I is the drawing instruction I acquired with respect to the graphic at least a part of which is drawn in the classified line sets L. The storage unit is the internal SRAM 201 depicted in FIG. 2B. For example, the area information that indicates the line sets L classified into the group is expressed by the area information that indicates the partitioned area at the start or the end in the order of generation, among the partitioned areas classified into the group, and the information that indicates the number of the partitioned areas classified into the group. Here, the information that indicates the line sets L classified into the group includes the start number as the area information that indicates the leading partitioned area and the consecutive count as the information that indicates the number of the partitioned areas classified into the group. Thus, the bit width of the area information can standardized, reducing the data volume.

For example, the drawing instruction sort executing unit 203 has a sorted intermediate data compressing unit 231 and a sorted intermediate data generating unit 232.

The sorted intermediate data compressing unit 231 controls generation of sorted intermediate data by the sorted intermediate data generating unit 232. The sorted intermediate data compressing unit 231 has a consecutive count embedding unit 235, a start number determining unit 233, and a deleting switch 234.

The start number determining unit 233, refers to the start number buffer Lsb and judges whether the data is redundant pre-sort intermediate data, for each line set L. If the data is judged not to be redundant, the start number determining unit 233 drives the consecutive count embedding unit 235 to read out the consecutive line set count from the consecutive count buffer Lcb. For example, the start number determining unit 233 outputs, for example, an Lcb read-out instructing signal to the consecutive count embedding unit 235. If the data is judged to be redundant, the start number determining unit 233 drives the deleting switch 234 to delete the sorted intermediate data. For example, the start number determining unit 233 outputs, for example, a determination result signal to the deleting switch 234.

The consecutive count embedding unit 235, under control of the start number determining unit 233, reads out the consecutive line set count from the consecutive count buffer Lcb and transfers the consecutive line set count to the sorted intermediate data generating unit 232.

The deleting switch 234, under control of start number determining unit 233, causes the sorted intermediate data generating unit 232 to generate the sorted intermediate data from which the redundant intermediate data has been deleted.

If the consecutive line set count data has been received from the consecutive count embedding unit 235, the sorted intermediate data generating unit 232 generates a line set start instruction, a consecutive line set count Lci, the area information that indicates the line start, and the drawing instruction I, correlated to one another. If a deletion instructing signal has been received from the deleting switch 234, the sorted intermediate data generating unit 232 does not generate the drawing instruction I.

Details of generation examples of the sorted intermediate data will be described with reference to generation example 1 and generation example 2. The drawing executing unit 204 depicted in FIG. 2B is a functional block example of generation example 1. The functional block example of generation example 2 is omitted.

GENERATION EXAMPLE 1

The drawing instruction sort executing unit 203 performs processing, for example, for each line set L in the order of generation. The drawing instruction sort executing unit 203 reads out the value of the start number buffer Lsb corresponding to a given line set L. If the read-out start number and the given line set L do not match, then the drawing instruction sort executing unit 203 does not generate the drawing instruction I. If the read-out start number and the given line set L match, the drawing instruction sort executing unit 203 reads out the value of the consecutive count buffer Lcb. If the read-out value is 0, the drawing instruction sort executing unit 203 does not generate the drawing instruction I. If the read-out value is 1, the drawing instruction sort executing unit 203 generates the drawing instruction I. If the read-out value is 2 or more, the drawing instruction sort executing unit 203 generates the drawing instruction I and does not generate the drawing instruction I for the line set L immediately following the given line set L, in order of generation, to a subsequent (read-out value less 1) line set L.

Figure 17:
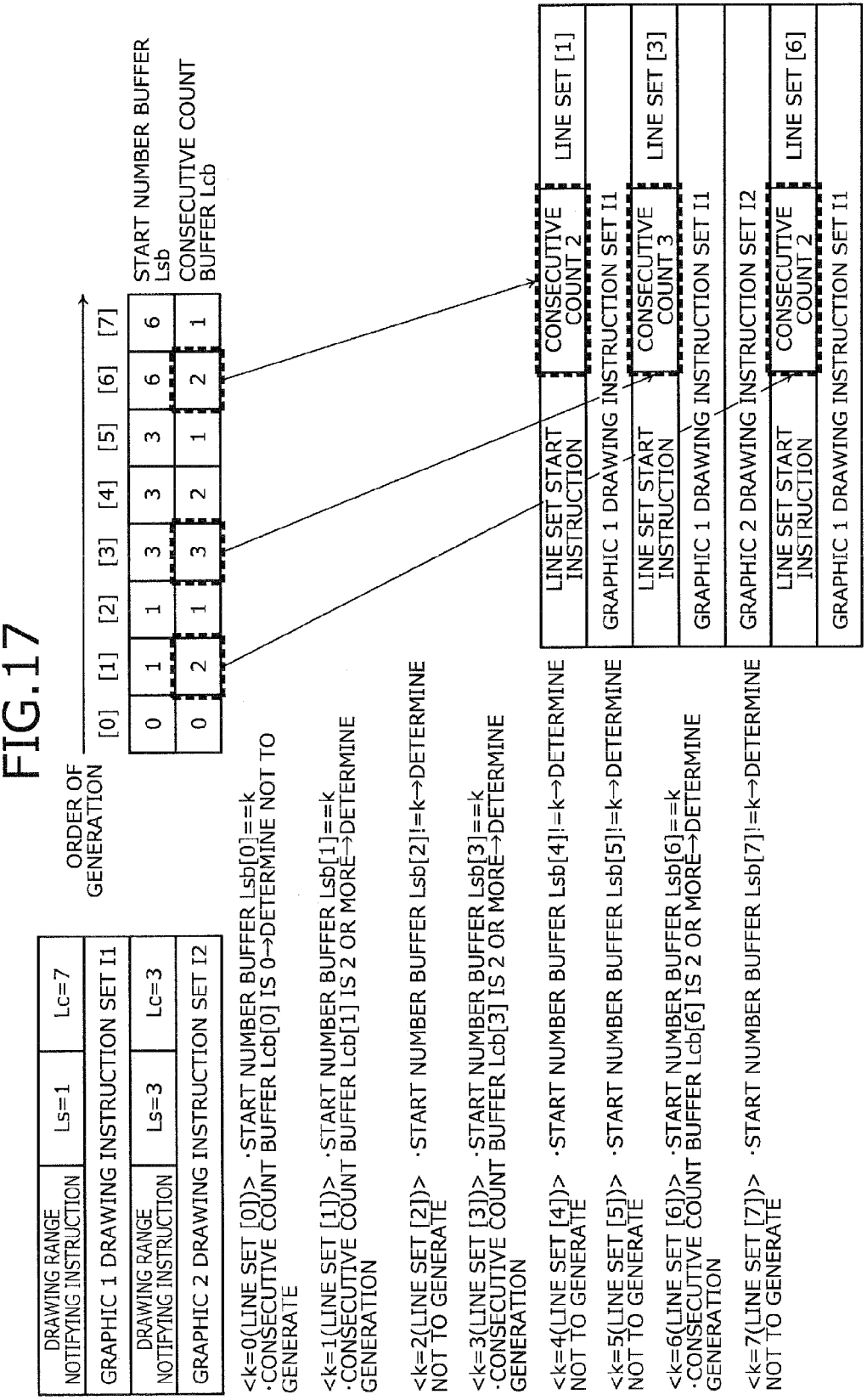
FIG. 17 is an explanatory diagram of sorted intermediate data generation example 1.

FIG. 17 is an explanatory diagram of sorted intermediate data generation example 1. For easier understanding, the consecutive count buffer Lcb and the start number buffer Lsb determined by updating example 1 described above are given as an example. k is an identifier to determine the given line set L.

In the case of k=0, since the value of start number buffer Lsb[0] is k and the value of consecutive count buffer Lcb[0] is 0, the drawing instruction sort executing unit 203 determines not to generate the drawing instruction I. In the case of k=1, since the value of start number buffer Lsb[1] is k and the value of consecutive count buffer Lcb[1] is 2 or more, the drawing instruction sort executing unit 203 determines to generate the drawing instruction I. The drawing instruction sort executing unit 203 correlates and stores to the internal SRAM 201, the line set start instruction, the value of consecutive count buffer Lcb[1], and the number of the line set L. The drawing instruction sort executing unit 203 stores the drawing instruction set of graphic 1 to a storage area continuous with the storage area in which the data were stored correlated to one another, within the internal SRAM 201.

In the case of k=2, since the value of start number buffer Lsb[2] is not k, the drawing instruction sort executing unit 203 determines not to generate the drawing instruction I. In the case of k=3, since the value of start number buffer Lsb[3] is k and the value of consecutive count buffer Lcb[3] is 2 or more, the drawing instruction sort executing unit 203 determines to generate the drawing instruction I. The drawing instruction sort executing unit 203 correlates and stores to the internal SRAM 201, the line set start instruction, the value of consecutive count buffer Lcb[3], and the number of the line set L. The drawing instruction sort executing unit 203 stores the drawing instruction set of graphic 1 and the drawing instruction set of graphic 2 to a storage area continuous with the storage area in which the data were stored correlated to one another, within the internal SRAM 201.

In the case of k=4, since the value of start number buffer Lsb[4] is not k, the drawing instruction sort executing unit 203 determines not to generate the drawing instruction I. In the case of k=5, since the value of start number buffer Lsb[5] is not k, the drawing instruction sort executing unit 203 determines not to generate the drawing instruction I. In the case of k=6, since the value of start number buffer Lsb[6] is k and the value of consecutive count buffer Lcb[6] is 2 or more, the drawing instruction sort executing unit 203 determines to generate the drawing instruction I. The drawing instruction sort executing unit 203 correlates and stores to the internal SRAM 201, the line set start instruction, the value of consecutive count buffer Lcb[6], and the number of the line set L. The drawing instruction sort executing unit 203 stores the drawing instruction set of graphic 1 to a storage area continuous with the storage area in which the data were stored correlated to one another, within the internal SRAM 201.

Finally, in the case of k=7, since the value of start number buffer Lsb[7] is not k, the drawing instruction sort executing unit 203 determines not to generate the drawing instruction I.

GENERATION EXAMPLE 2

The drawing instruction sort executing unit 203 performs processing, for example, for each line set L in the order of generation. The drawing instruction sort executing unit 203 reads out the value of the consecutive count buffer Lcb corresponding to a given line set L. If the read-out value is 0, the drawing instruction sort executing unit 203 does not generate the drawing instruction I and reads out the consecutive count buffer Lcb corresponding to the line set L immediately subsequent to the given line set L in the order of generation. On the other hand, if the read-out value is 1 and the value of the consecutive count buffer Lcb corresponding to the line set L immediately before the given line set L in the order of generation is 1 or 0, the drawing instruction sort executing unit 203 generates the drawing instruction I for the given line set L. If the read-out value is 2 or more and the value of the consecutive count buffer Lcb corresponding to the line set L immediately before the given line set L in the order of generation is 1 or 0, the drawing instruction sort executing unit 203 generates the drawing instruction I for the given line set L. The drawing instruction sort executing unit 203 does not generate the drawing instruction I for the line set L immediately subsequent to the given line set L in the order of generation to a subsequent line set L that is a given number of line sets L later, the given number being equal to the read-out value.

Figure 18:
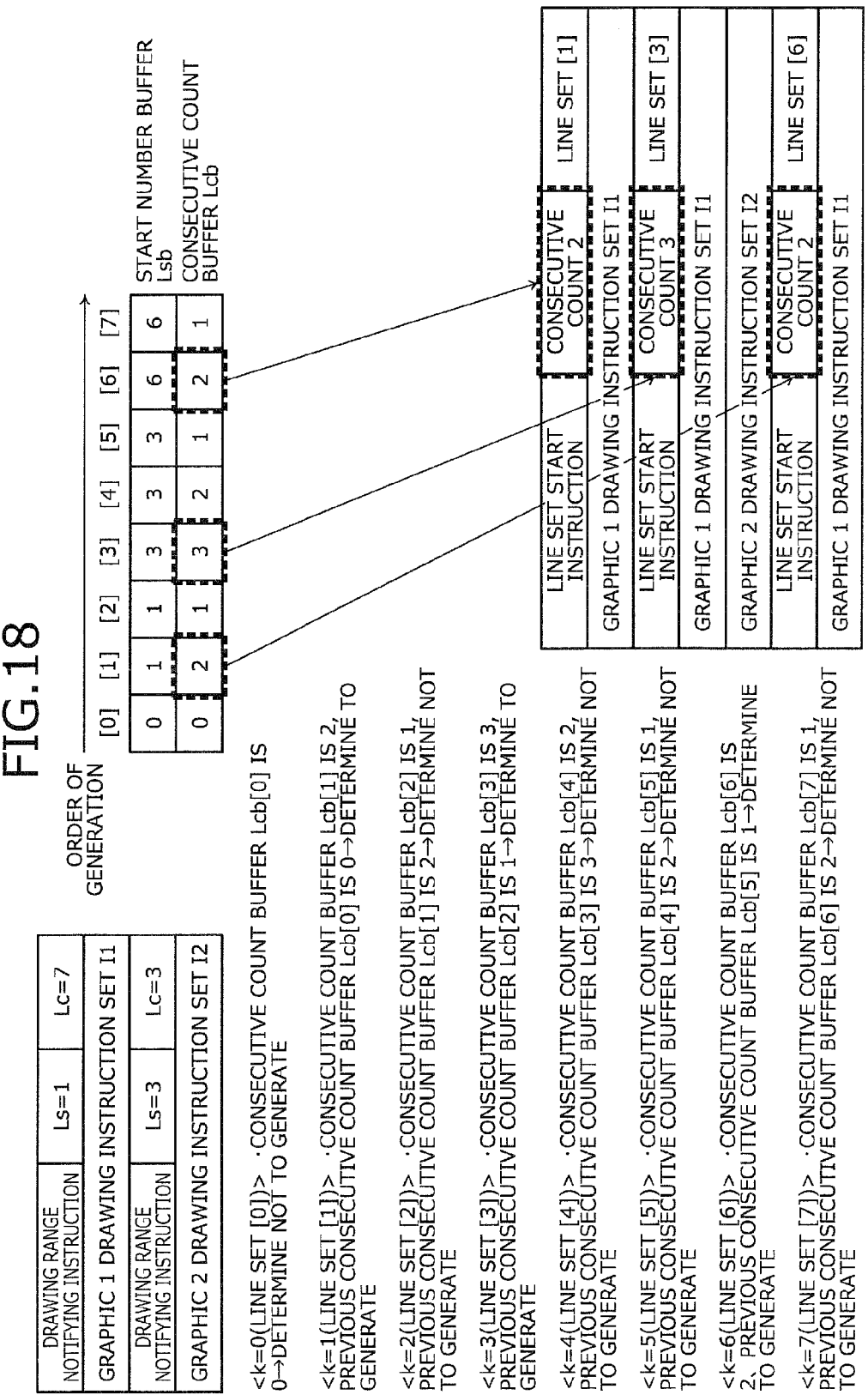
FIG. 18 is an explanatory diagram of sorted intermediate data generation example 2.

FIG. 18 is an explanatory diagram of sorted intermediate data generation example 2. For easier understanding, the consecutive count buffer Lcb and the start number buffer Lsb determined by updating example 1 described above are given as an example. k is an identifier to determine the given line set L. In the case of k=0, since the value of consecutive count buffer Lcb[0] is 0, the drawing instruction sort executing unit 203 determines not to generate the drawing instruction I.

In the case of k=1, since the value of consecutive count buffer Lcb[1] is 1 and the value of consecutive count buffer Lcb[0] corresponding to the line set L immediately before in the order of generation is 0, the drawing instruction sort executing unit 203 determines to generate the drawing instruction I. The consecutive count buffer Lcb corresponding to the line set L immediately before in the order of generation is referred to as the immediately preceding consecutive count buffer Lcb. The drawing instruction sort executing unit 203 correlates and stores L to the internal SRAM 201, the line set start instruction, the value of consecutive count buffer Lcb[1], and the number of the line set. The drawing instruction sort executing unit 203 stores the drawing instruction set of graphic 1 to a storage area continuous with the storage area in which the data were stored correlated to one another, within the internal SRAM 201.

In the case of k=2, since the value of consecutive count buffer Lcb[2] is 1 and the value of immediately preceding consecutive count buffer Lcb[1] is 2, the drawing instruction sort executing unit 203 determines not to generate the drawing instruction I. In the case of k=3, since the value of consecutive count buffer Lcb[3] is 3 and the value of immediately preceding consecutive count buffer Lcb[2] is 1, the drawing instruction sort executing unit 203 determines to generate the drawing instruction I. The drawing instruction sort executing unit 203 correlates and stores to the internal SRAM 201, the line set start instruction, the value of consecutive count buffer Lcb[3], and the number of the line set L. The drawing instruction sort executing unit 203 stores the drawing instruction set of graphic 1 and the drawing instruction set of graphic 2 to a storage area continuous with the storage area in which the data were stored correlated to one another, within the internal SRAM 201.

In the case of k=4, since the value of consecutive count buffer Lcb[4] is 2 and the value of immediately preceding consecutive count buffer Lcb[3] is 3, the drawing instruction sort executing unit 203 determines not to generate the drawing instruction I. In the case of k=5, since the value of consecutive count buffer Lcb[5] is 1 and the value of immediately preceding consecutive count buffer Lcb[4] is 2, the drawing instruction sort executing unit 203 determines not to generate the drawing instruction I.

In the case of k=6, since the value of consecutive count buffer Lcb[6] is 2 and the value of immediately preceding consecutive count buffer Lcb[5] is 1, the drawing instruction sort executing unit 203 determines to generate the drawing instruction I. The drawing instruction sort executing unit 203 correlates and stores to the internal SRAM 201, the line set start instruction, the value of consecutive count buffer Lcb[6], and the number of the line set L. The drawing instruction sort executing unit 203 stores the drawing instruction set of graphic 2 to a storage area continuous with the storage area in which the data were stored correlated to one another, within the internal SRAM 201.

At last, in the case of k=7, since the value of consecutive count buffer Lcb[7] is 1 and the value of immediately preceding consecutive count buffer Lcb[6] is 2, the drawing instruction sort executing unit 203 determines not to generate the drawing instruction I.

FIG. 19 is an explanatory diagram of a sorted intermediate data example related to the graphic example depicted in FIG. 3. Sorted intermediate data 1900 has the line set start instruction with the consecutive count and the number of the line set L embedded therein, and a drawing instruction set, arranged for each group. The sorted intermediate data 1900 is stored in a sorted intermediate data area 214 within the internal SRAM 201. The line sets L to be used by the drawing instruction set following the line set start instruction can be identified by the line set start instruction, the consecutive count, and the number of the line set L.

Figure 20:
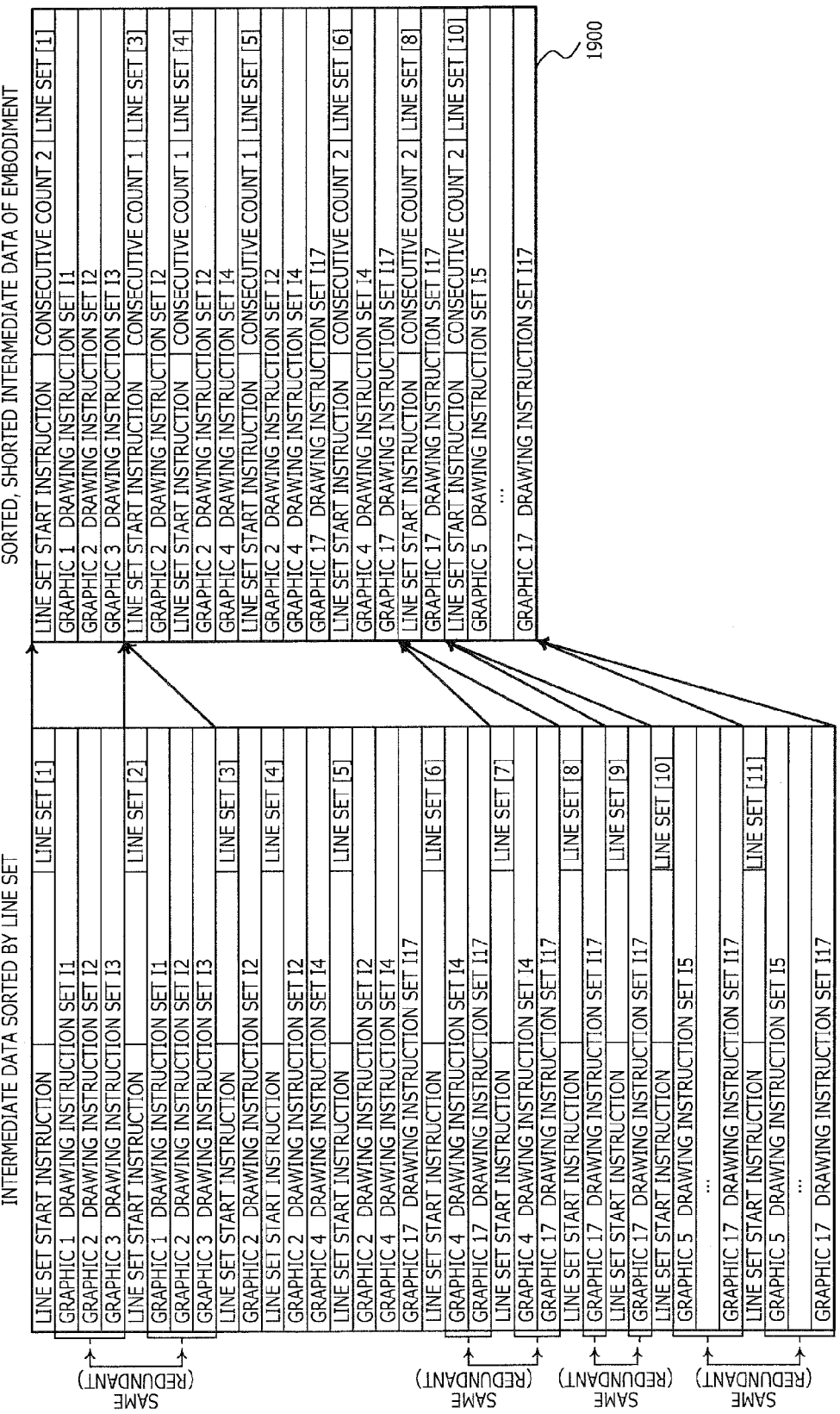
FIG. 20 is an explanatory diagram of a comparison of an example of the intermediate data sorted by line set L and an example of the sorted intermediate data of the embodiment.

FIG. 20 is an explanatory diagram of a comparison of an example of the intermediate data sorted by the line set L and an example of the sorted intermediate data of the embodiment. For example, in the example of the intermediate data sorted by the line set L, the values of line set L[1] and line set L[2] are the same and therefore, are redundant, but in the sorted intermediate data 1900 of the embodiment, redundant drawing instructions are put together into one.

The drawing executing unit 204 generates for each of the partitioned areas indicated by the acquired area information, image data that indicates each pixel within a line set L, based on the drawing instruction I stored in the storage unit and correlated with the area information indicated by the line set L. As described above, the storage unit is the internal SRAM 201.

The drawing executing unit 204 is a generating unit that for each of the classified groups, identifies for a given group, the drawing instruction I stored in the storage unit, and generates based on the identified drawing instruction I, image data for each partitioned area classified into the given group. Thus, for each given group, by searching the internal SRAM 201 for a drawing instruction I, the number of searches can be reduced. The drawing instruction sort executing unit 203 stores to a second storage unit, an address that indicates the storage area in which the identified drawing instruction I is stored within the storage unit. Based on the drawing instruction I stored in the storage area indicated by the address stored in the second storage unit, the drawing executing unit 204 generates image data for each partitioned area classified into the given group. Thus, with storage of only the address of the drawing instruction I, a small amount of information can shorten the time consumed for searching. The second storage unit is, for example, a sorted intermediate data start address register 245.

For example, the drawing executing unit 204 has a sorted intermediate data restoring unit 241, a second drawing instruction decoder 242, a drawing unit 243, and a line buffer lbuf. The sorted intermediate data restoring unit 241 transfers to the second drawing instruction decoder 242, restored intermediate data obtained by restoring the sorted intermediate data stored in the internal SRAM 201. The sorted intermediate data restoring unit 241 has, for example, a consecutive number reading unit 244, a drawing consecutive number counter Lccd, a sorted intermediate data reproducing unit 246, and the sorted intermediate data start address register 245.

The consecutive number reading unit 244 reads the consecutive line set count embedded in the line set start instruction of the sorted intermediate data and sets the consecutive line set count in the drawing consecutive number counter Lccd. The drawing consecutive number counter Lccd regards the consecutive line set count set by the consecutive number reading unit 244 as an initial value and counts down each time the line set L to be generated moves from one line set to another. The drawing consecutive number counter Lccd makes it possible to determine the line set L at which processing using the current intermediate data is finished.

When the number of the given line set L matches the number embedded in the line set start instruction, the sorted intermediate data start address register 245 holds the address of the storage area of the drawing instruction I stored next to the line set start instruction.

The sorted intermediate data restoring unit 246 restores the sorted intermediate data by reading out from the internal SRAM 201, the sorted intermediate data indicated by the address stored in the sorted intermediate data start address register 245. The sorted intermediate data restoring unit 246 transfers the restored intermediate data to the second drawing instruction decoder 242.

The second drawing instruction decoder 242 decodes the drawing instruction set of each graphic included in the restored intermediate data and transfers the decoded drawing instruction set to the drawing unit 243. Further, the second drawing instruction decoder 242, at the time of detection of an instruction as a trigger to acquire the vertex data during decoding, sends a vertex data acquisition instructing signal to the drawing unit 243. The drawing unit 243, upon receiving the vertex data acquisition instructing signal, reads out the vertex data from the vertex data area 212 in the internal SRAM 201 and executes drawing to generate the image data of each pixel of the line set L.

Figure 21:
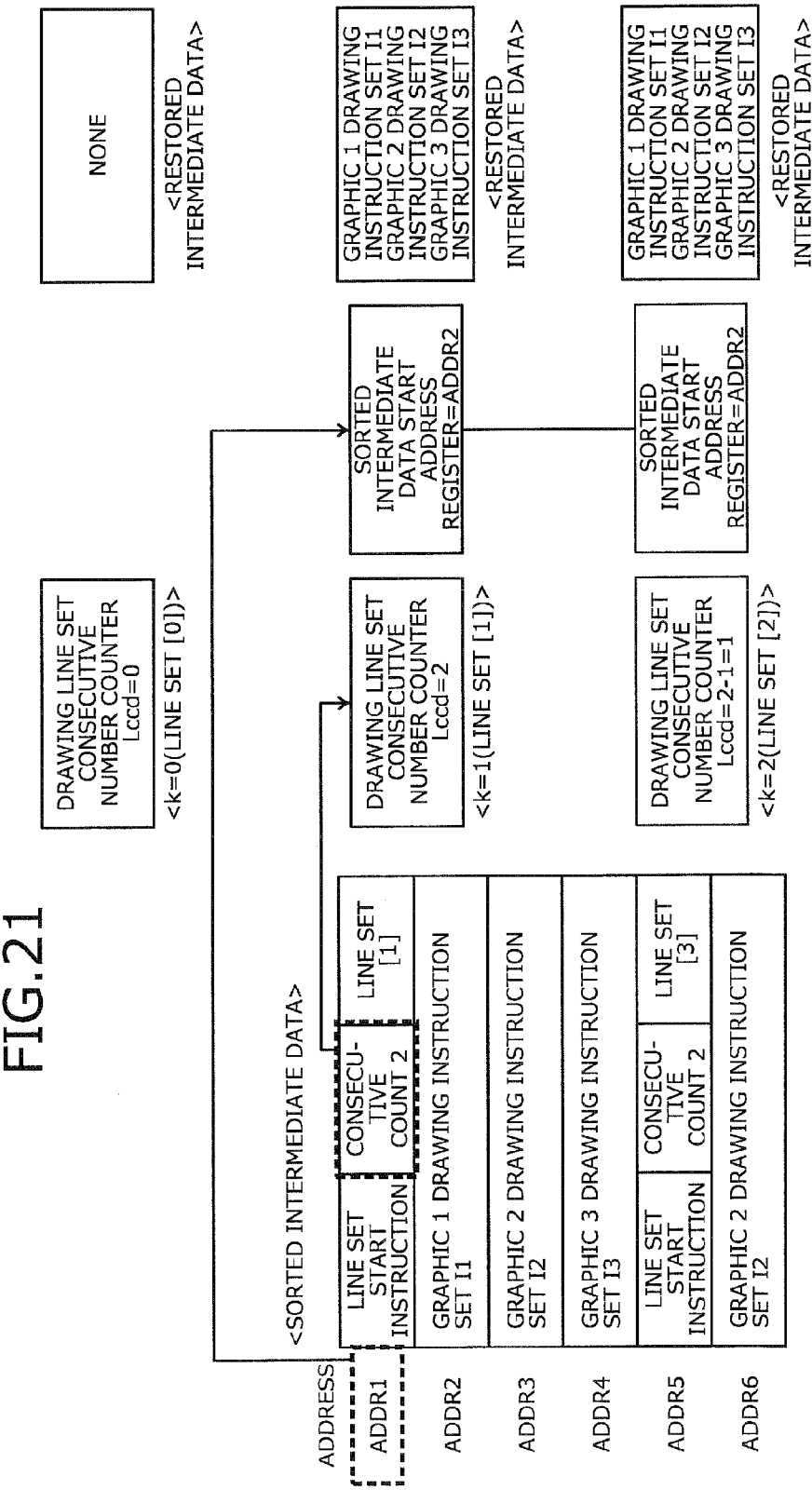
FIG. 21 is an explanatory diagram of a drawing data restoring example.

FIG. 21 is an explanatory diagram of a drawing data restoring example. For easier understanding, description will be made citing an example of simple sorted intermediate data. k is an identifier that indicates the line set L as an object of drawing. The drawing executing unit 204 resets the drawing consecutive number counter Lccd to 0. The drawing executing unit 204 reads out the sorted intermediate data sequentially from the top. In the case of k=0, since the number of the line set L embedded in the line set start instruction is different from k, the drawing executing unit 204 increments k.

In the case of k=1, since the number of the line set L embedded in the line set start instruction is equal to k, the drawing executing unit 204 reads the consecutive line set count embedded in the line set start instruction. The drawing executing unit 204 stores the address ADDR2 of the storage area of the drawing instruction I stored next to the line set start instruction in the sorted intermediate data start address register 245. The drawing executing unit 204 extracts all of the drawing instruction sets from the drawing instruction set I1 indicated by the address ADDR2 stored in the sorted intermediate data start address register 245 to the drawing instruction set I3 immediately before the next line set start instruction. Consequently, the extracted drawing instruction sets become the restored intermediate data.

In the case of k=2, since the value of the drawing consecutive number counter Lccd is 1 or more, the drawing executing unit 204 causes the drawing consecutive number counter Lccd to count down. The drawing executing unit 204 extracts all drawing instruction sets from the drawing instruction set indicated by the address ADDR2 stored in the sorted intermediate data start address register 245 to the drawing instruction set immediately before the next line set start instruction. Consequently, the extracted drawing instruction sets become the restored intermediate data. Thus, the drawing executing unit 204 can generate the image data for each line set L by generating the restored intermediate data for each line set L. Since this makes it unnecessary to redundantly store the drawing instruction I for each of all line sets L in the storage area, whereby memory saving can be achieved.

Figure 22:
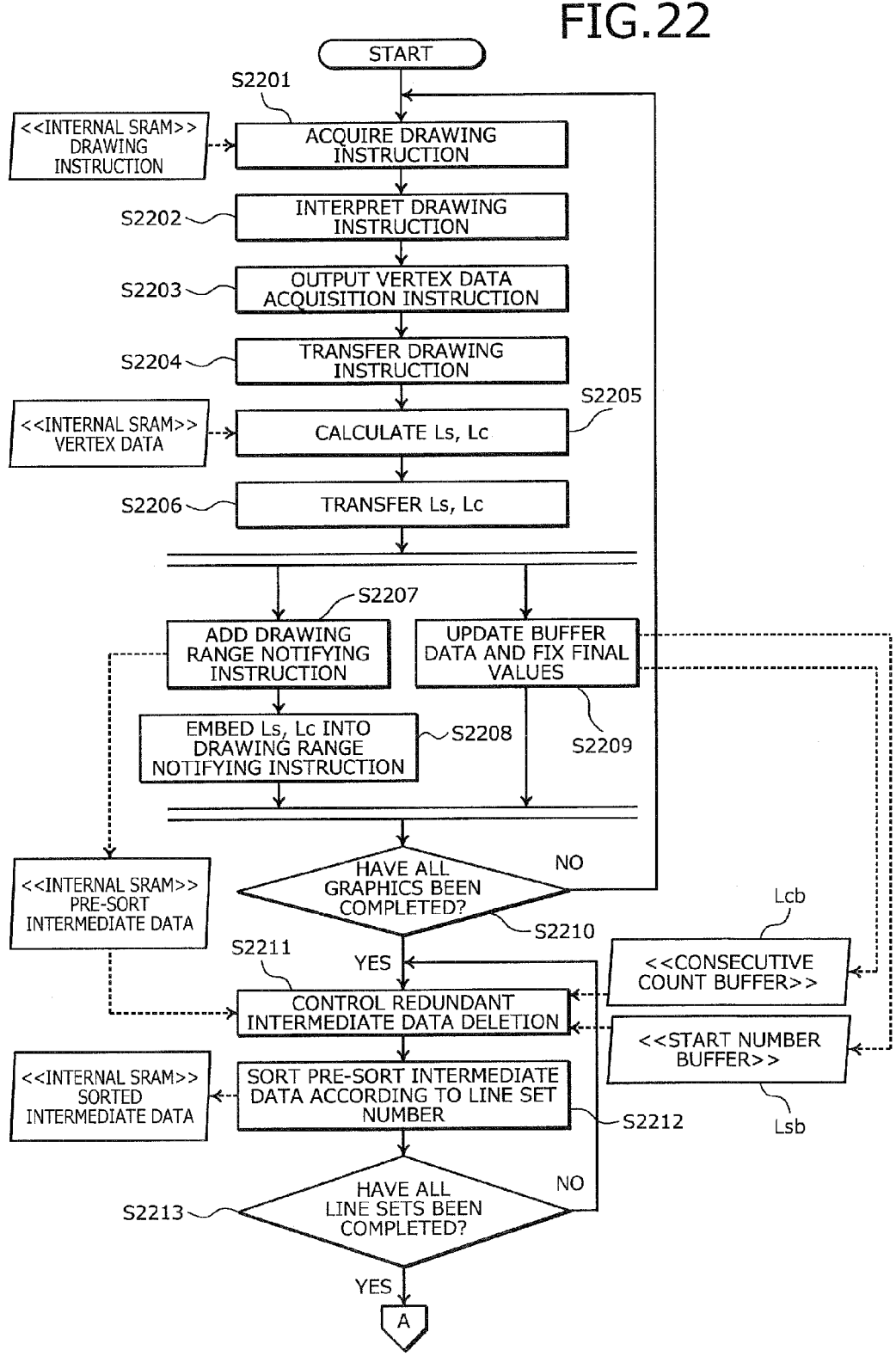
FIGS. 22 and 23 are a flowchart of a procedure example of image processing by the image processing apparatus.
Figure 23:
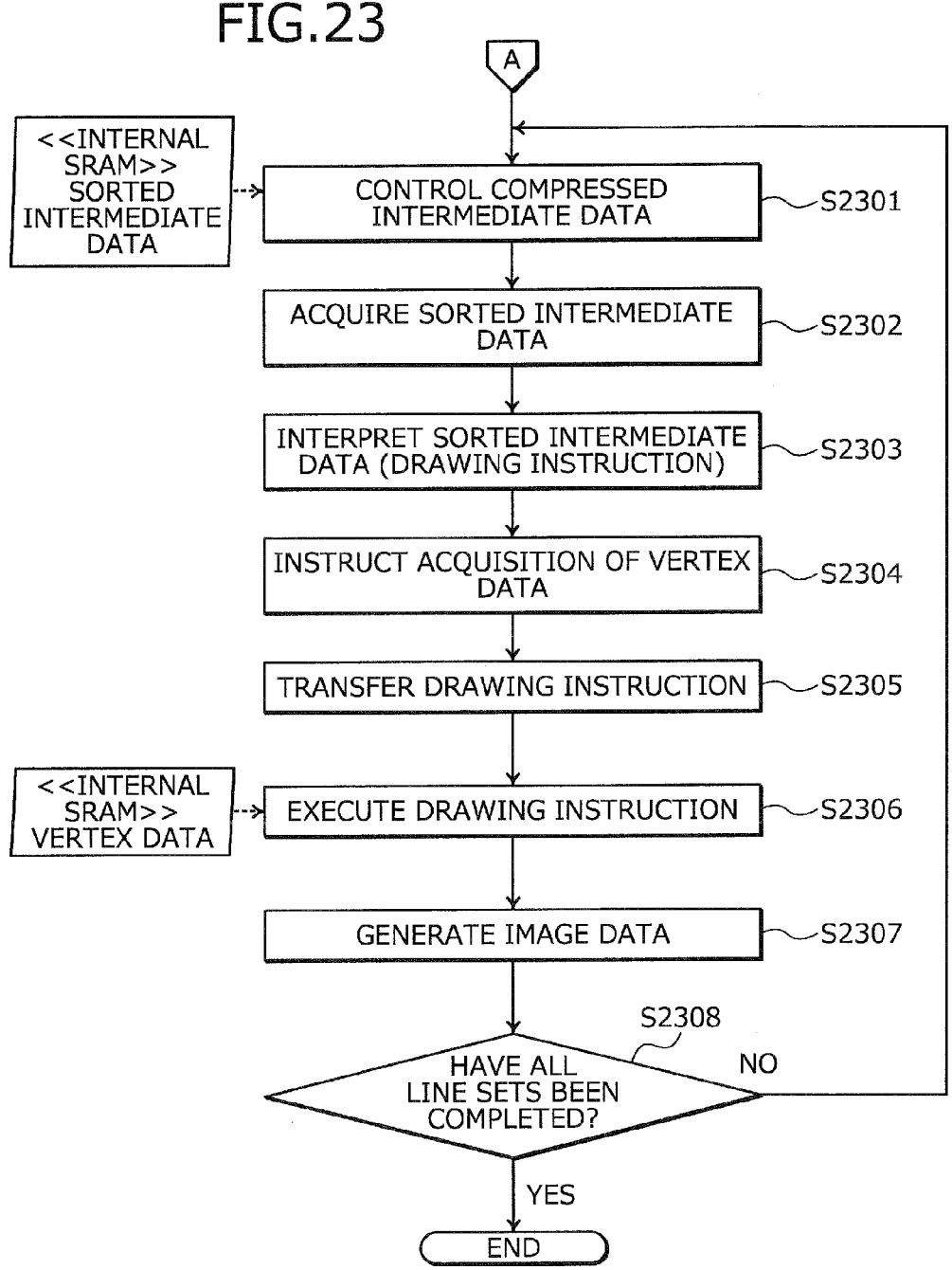

FIGS. 22 and 23 are a flowchart of a procedure example of the image processing by the image processing apparatus. The image processing apparatus 100, by the first drawing instruction decoder 223, acquires the drawing instruction I of a given graphic to be subject to processing, from the drawing instruction I (step S2201). The image processing apparatus 100, by the first drawing instruction decoder 223, interprets the acquired drawing instruction I (step S2202). The image processing apparatus 100, by the first drawing instruction decoder 223, outputs a vertex data acquisition instruction (step S2203). The image processing apparatus 100, by the first drawing instruction decoder 223, transfers the drawing instruction I (step S2204).

The image processing apparatus 100, by the drawing range calculating unit 224, calculates the start number Ls and the consecutive number Lc (step S2205). The image processing apparatus 100, by the drawing range calculating unit 224, transfers the start number Ls and the consecutive number Lc to the classifying unit 222 and the pre-sort intermediate data generating unit 225 (step S2206). After step S2206, the flow goes to step S2207 and step S2209.

The image processing apparatus 100, by the pre-sort intermediate data generating unit 225, adds the drawing range notifying instruction (step S2207). The image processing apparatus 100, by the pre-sort intermediate data generating unit 225, embeds the start number Ls and the consecutive number Lc into the drawing range notifying instruction (step S2208). The drawing range notifying instruction is, for example, the line set start instruction described above. The image processing apparatus 100, by the classifying unit 222, updates each buffer and fixes the final values (step S2209).

After step S2208 and step S2209, the image processing apparatus 100, by the drawing instruction pre-sort processing unit 202, judges whether all graphics have become the given graphic to be subject to processing and the generation of the pre-sort intermediate data has finished (step S2210). If it is judged that the data generation is not finished (step S2210: NO), the image processing apparatus 100 goes back to step S2201. On the other hand, if it is judged that the data generation has finished (step S2210: YES), the image processing apparatus 100, by the sorted intermediate data compressing unit 231, controls deletion of the redundant intermediate data with respect to the given line set L (step S2211).

The image processing apparatus 100 sorts the pre-sort intermediate data in order of the line set number (step S2212). The image processing apparatus 100 judges whether all line sets L have become the given line set L and the deletion of the redundant intermediate data has been completed (step S2213). If it is judged that the data deletion has not been completed (step S2213: NO), the image processing apparatus 100 goes back to step S2211.

On the other hand, if it is judged that the data deletion has been completed (step S2213: YES), the image processing apparatus 100, by the sorted intermediate data restoring unit 241, controls the compressed intermediate data with respect to the given line set L (step S2301). The image processing apparatus 100 acquires the sorted intermediate data (step S2302). The image processing apparatus 100, by the sorted intermediate data restoring unit 241, interprets the sorted intermediate data (step S2303). The image processing apparatus 100, by the sorted intermediate data restoring unit 241, outputs the vertex data acquisition instruction (step S2304). The image processing apparatus 100, by the sorted intermediate data restoring unit 241, transfers the drawing instruction I (step S2305). The image processing apparatus 100, by the drawing unit 243, executes the drawing instruction I transferred by the sorted intermediate data restoring unit 241 (step S2306). The image processing apparatus 100 generates image data for the given line set L to the line buffer lbuf (step S2307). The image processing apparatus 100 judges whether all line sets L have become the given line set L and the generation of the image data has finished (step S2308).

If it is judged that the generation of the image data is finished (step S2308: YES), the image processing apparatus 100 ends a sequence of processing. If it is judged that the generation of the image data has not finished (step S2308: NO), the image processing apparatus 100 goes back to step S2301.

Figure 24:
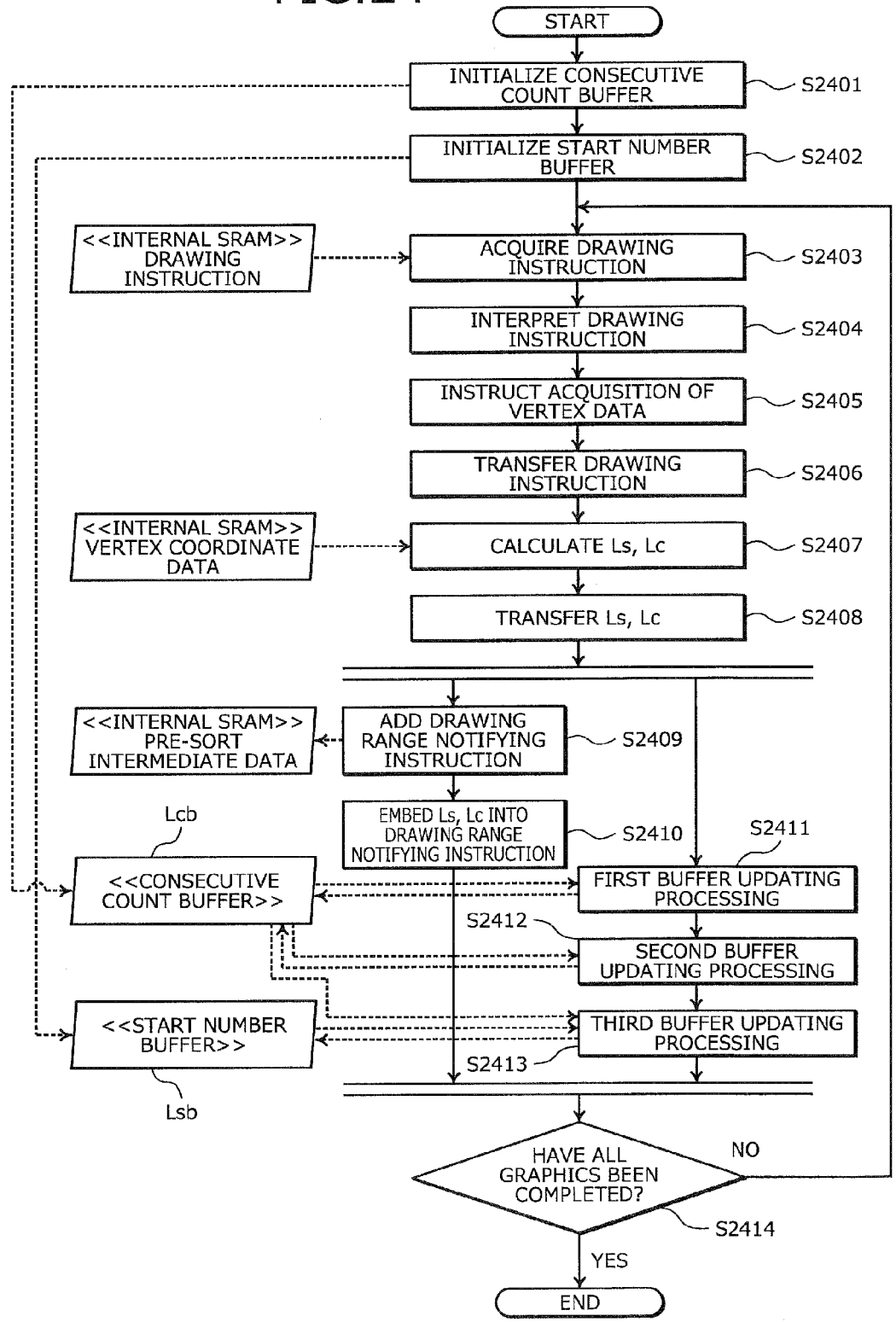
FIG. 24 is a flowchart of a procedure example of pre-sort processing by the image processing apparatus.

FIG. 24 is a flowchart of a procedure example of pre-sort processing by the image processing apparatus. Detailed procedure will be described of the steps S2201 to S2210 described above. The image processing apparatus 100, by the classifying unit 222, initializes the consecutive count buffer Lcb (step S2401). The image processing apparatus 100, by the classifying unit 222, initializes the start number buffer Lsb (step S2402). The image processing apparatus 100 acquires the drawing instruction I of the given graphic (step S2403). The image processing apparatus 100, by the first drawing instruction decoder 223, interprets the acquired drawing instruction I (step S2404). The image processing apparatus 100, by the first drawing instruction decoder 223, outputs the vertex data acquisition instruction (step S2405). The image processing apparatus 100, by the first drawing instruction decoder 223, transfers the drawing instruction I (step S2406).

The image processing apparatus 100, by the drawing range calculating unit 224, calculates the start number Ls and the consecutive number Lc (step S2407). The image processing apparatus 100, by the drawing range calculating unit 224, transfers the start number Ls and the consecutive number Lc to the classifying unit 222 and the pre-sort intermediate data generating unit 225 (step S2408). After step S2408, the flow goes to step S2409 and step S2411.

The image processing apparatus 100, by the pre-sort intermediate data generating unit 225, adds the drawing range notifying instruction (step S2409). The image processing apparatus 100, by the pre-sort intermediate data generating unit 225, embeds the start number Ls and the consecutive number Lc in the drawing range notifying instruction (step S2410) and goes to step S2414. On the other hand, the image processing apparatus 100, by the classifying unit 222, performs first buffer updating processing (step S2411).

The image processing apparatus 100, by the classifying unit 222, performs second buffer updating processing (step S2412). The image processing apparatus 100, by the classifying unit 222, performs third buffer updating processing (step S2413). The image processing apparatus 100 judges whether all graphics have become the given graphic to be subject to processing and the generation of the pre-sort intermediate data has finished (step S2414). If it is judged that the data generation has not finished (step S2414: NO), the image processing apparatus goes back to step S2403. On the other hand, if it is judged that the data generation is finished (step S2414: YES), the image processing apparatus 100 ends a sequence of processing.

Figure 25:
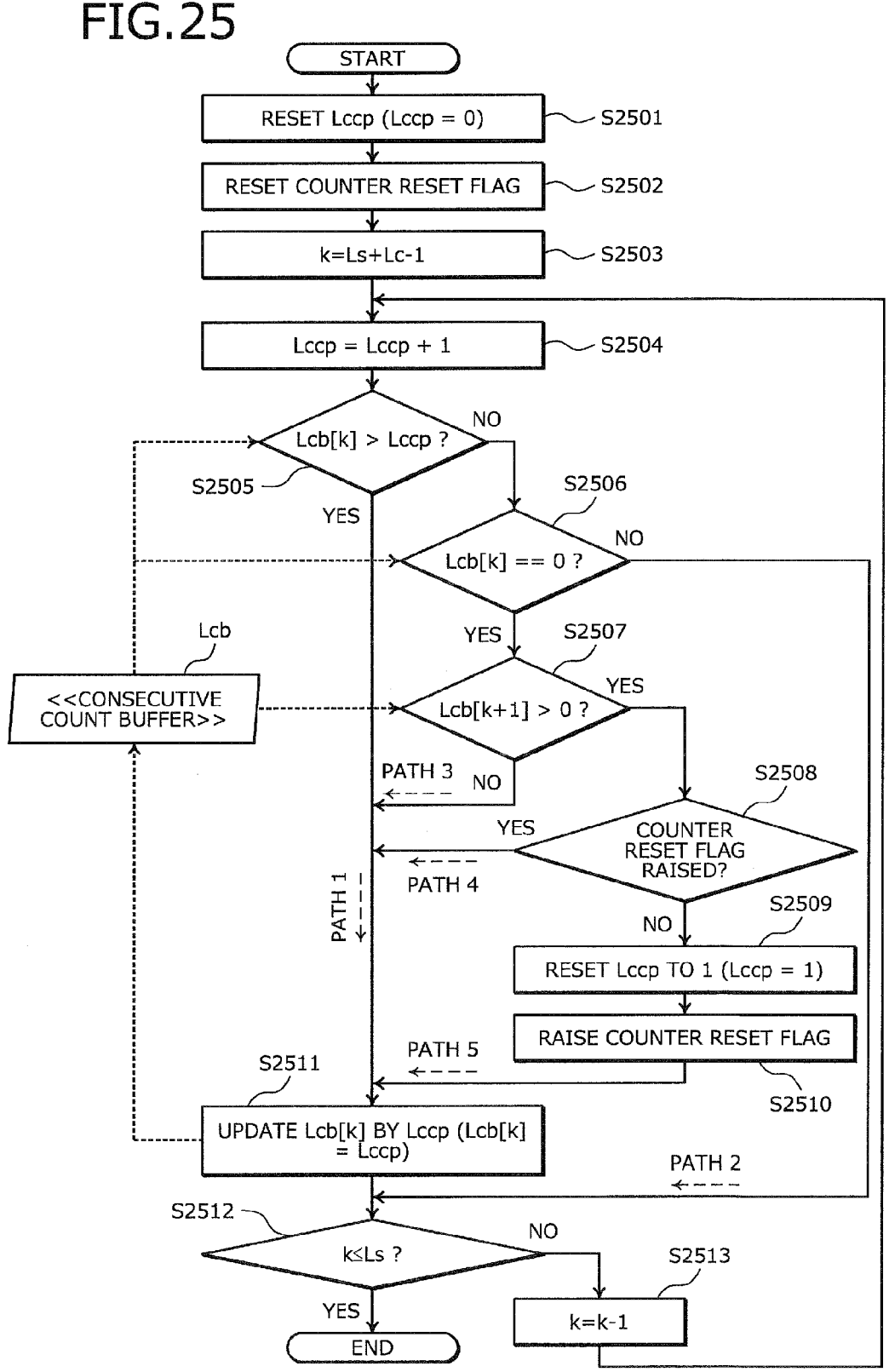
FIG. 25 is a flowchart of a procedure example of first updating processing.

FIG. 25 is a flowchart of a procedure example of the first updating processing. The image processing apparatus 100, by the consecutive count comparing unit 226, resets the pre-processing consecutive number counter Lccp to 0 (step S2501). For example, the image processing apparatus 100 sets Lccp=0. The image processing apparatus 100, by the consecutive count comparing unit 226, resets the counter reset flag (step S2502). The image processing apparatus 100 sets k=Ls+Lc−1 (step S2503). k goes from Ls+Lc−1 back to Ls. k is in descending order because, when plural graphics partially occupy the same line set, decrease of the omissible consecutive line set count by the greatest common divisor is coped with by the value of the pre-processing consecutive number counter Lccp counting up from 1.

The image processing apparatus 100, by the consecutive count comparing unit 226, sets Lccp=Lccp+1 (step S2504). The image processing apparatus 100, by the consecutive count comparing unit 226, judges whether Lcb[k]>Lccp is satisfied (step S2505). If Lcb[k]>Lccp is satisfied (step S2505: YES), the image processing apparatus 100 goes to step S2511.

If Lcb[k]>Lccp is not satisfied (step S2505: NO), the image processing apparatus 100, by the consecutive count comparing unit 226, judges whether Lcb[k]==0 is satisfied (step S2506). Sign==means being equivalent in accordance with the syntax of programming language C. If Lcb[k]==0 is not satisfied (step S2506: NO), the image processing apparatus 100 goes to step S2512. If it is judged that Lcb[k]==0 is satisfied (step S2506: YES), the image processing apparatus 100, by the consecutive count comparing unit 226, judges whether Lcb[k+1]>0 is satisfied (step S2507).

If it is judged that Lcb[k+1]>0 is not satisfied (step S2507: NO), the image processing apparatus 100 goes to step S2511. If it is judged that Lcb[k+1]>0 is satisfied (step S2507: YES), the image processing apparatus 100, by the consecutive count comparing unit 226, judges whether the counter reset flag is raised (step S2508). The counter reset flag being raised indicates an enable state. If it is judged that the counter reset flag is raised (step S2508: YES), the image processing apparatus 100 goes to step S2511. The consecutive count buffer Lcb[k+1] being greater than 0 when the counter reset counter is raised means that, at the next line set [k+1], Lcb[k+1] has been updated by the current given graphic. Since this is not the updating of consecutive count buffer Lcb[k+1] caused by an overlap of the current given graphic and the previous given graphic, the current pre-processing consecutive number counter Lccp is suitable as the value of the consecutive count counter Lcb[k]. Therefore, in the case of YES at step S2508, the flow goes to step S2511.

If it is judged that the counter reset flag is not raised (step S2508: NO), the image processing apparatus 100, by the consecutive count comparing unit 226, resets the pre-processing consecutive counter Lccp to 1 (step S2509). The image processing apparatus 100 sets Lccp=1. The image processing apparatus 100, by the consecutive count comparing unit 226, raises the counter reset flag (step S2510). Then, the image processing apparatus 100, by the consecutive count comparing unit 226, updates the consecutive count buffer Lcb[k] by the pre-processing consecutive number counter Lccp (step S2511). For example, the image processing apparatus 100 sets Lcb[k]=Lccp. The consecutive count buffer Lcb[k+1] being greater than 0 when the counter reset counter is not raised means that, at the next line set [k+1], Lcb[k+1] has been updated by the overlap of the current given graphic and the previous given graphic; and further means that the next line set [k+1] is the top edge of a line set continuous section. Therefore, there appears a new line set continuous section along the direction of a smaller value of k from the current given line set [k]. Therefore, in the case of NO at step S2508, with the procedure taking path 5, the current pre-processing consecutive number counter Lccp is reset to 1 and the consecutive count buffer Lcb[k] is updated by 1. The counter reset flag is raised in preparation for the processing with respect to the next given line set.

The image processing apparatus 100, by the classifying unit 222, judges whether k≤Ls is satisfied (step S2512). If it is judged that k≤Ls is not satisfied (step S2512: NO), the image processing apparatus 100 sets k=k−1 (step S2513) and goes back to step S2504. If it is judged that k≤Ls is satisfied (step S2512: YES), the image processing apparatus 100 ends a sequence of processing.

Figure 26:
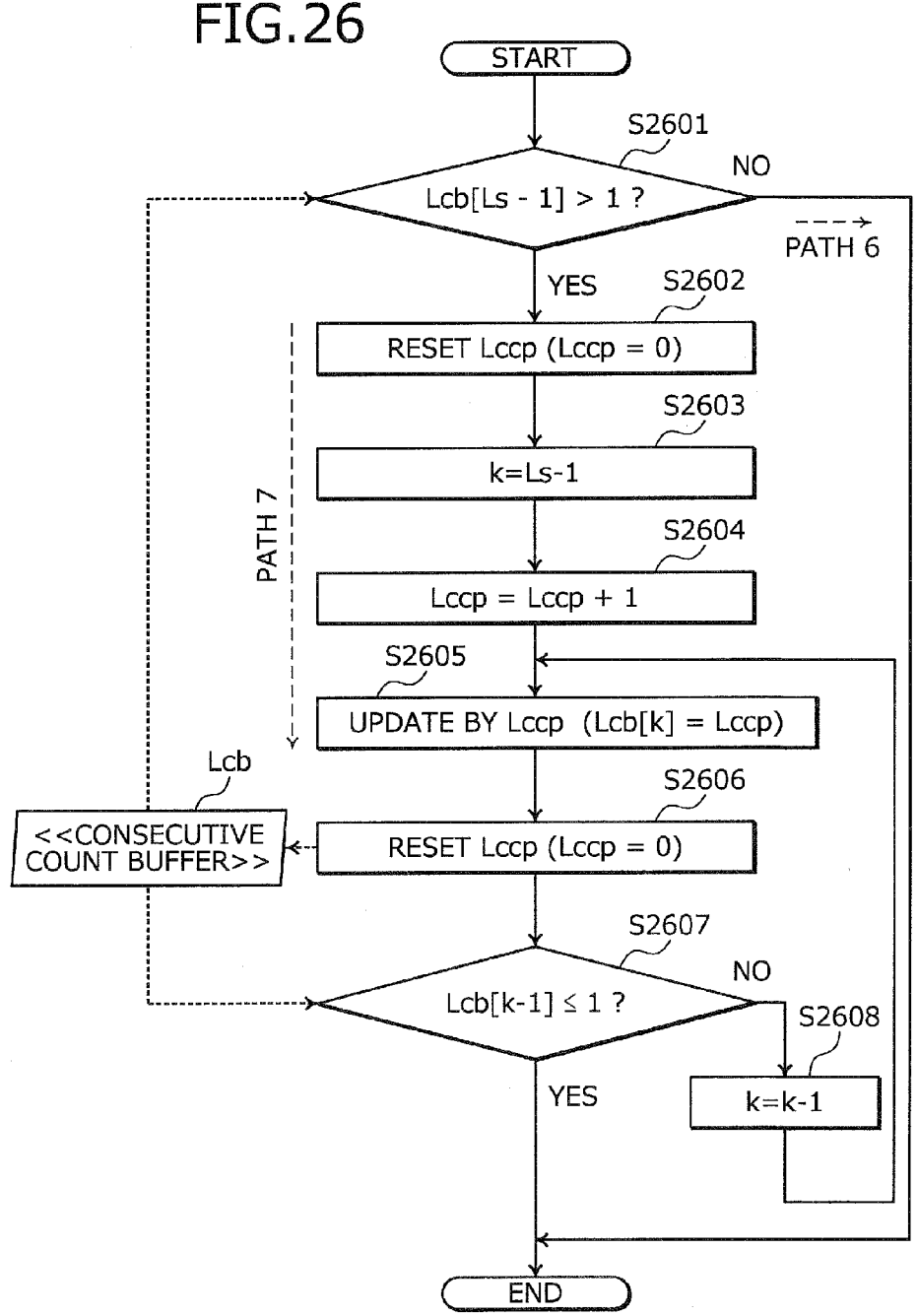
FIG. 26 is a flowchart of a procedure example of second updating processing.

FIG. 26 is a flowchart of a procedure example of second updating processing. The image processing apparatus 100, by the consecutive count comparing unit 226, judges whether Lcb[Ls−1]>1 is satisfied (step S2601). If it is judged that Lcb[Ls−1]>1 is satisfied (step S2601: YES), the image processing apparatus 100, by the consecutive count comparing unit 226, resets the pre-processing consecutive number counter Lccp to 0 (step S2602). For example, the image processing apparatus 100 sets Lccp=0. The image processing apparatus 100 sets k=Ls−1 (step S2603).

The image processing apparatus 100, by the consecutive count comparing unit 226, sets Lccp=Lccp+1 (step S2604). The image processing apparatus 100, by the consecutive count comparing unit 226, updates consecutive count buffer Lcb[k] by the Lccp (step S2605). For example, the image processing apparatus 100 sets Lcb[k]=Lccp.

The image processing apparatus 100 resets the Lccp to 0 (step S2606). The image processing apparatus 100, by the consecutive count comparing unit 226, judges whether Lcb[k−1]≤1 is satisfied (step S2607). If it is judged that Lcb[k−1]≤1 is satisfied (step S2607: YES), the image processing apparatus 100 ends a sequence of processing. If it is judged that Lcb[k−1]≤1 is not satisfied (step S2607: NO), the image processing apparatus 100 sets k=k−1 (step S2608) and goes back to step S2605.

Figure 27:
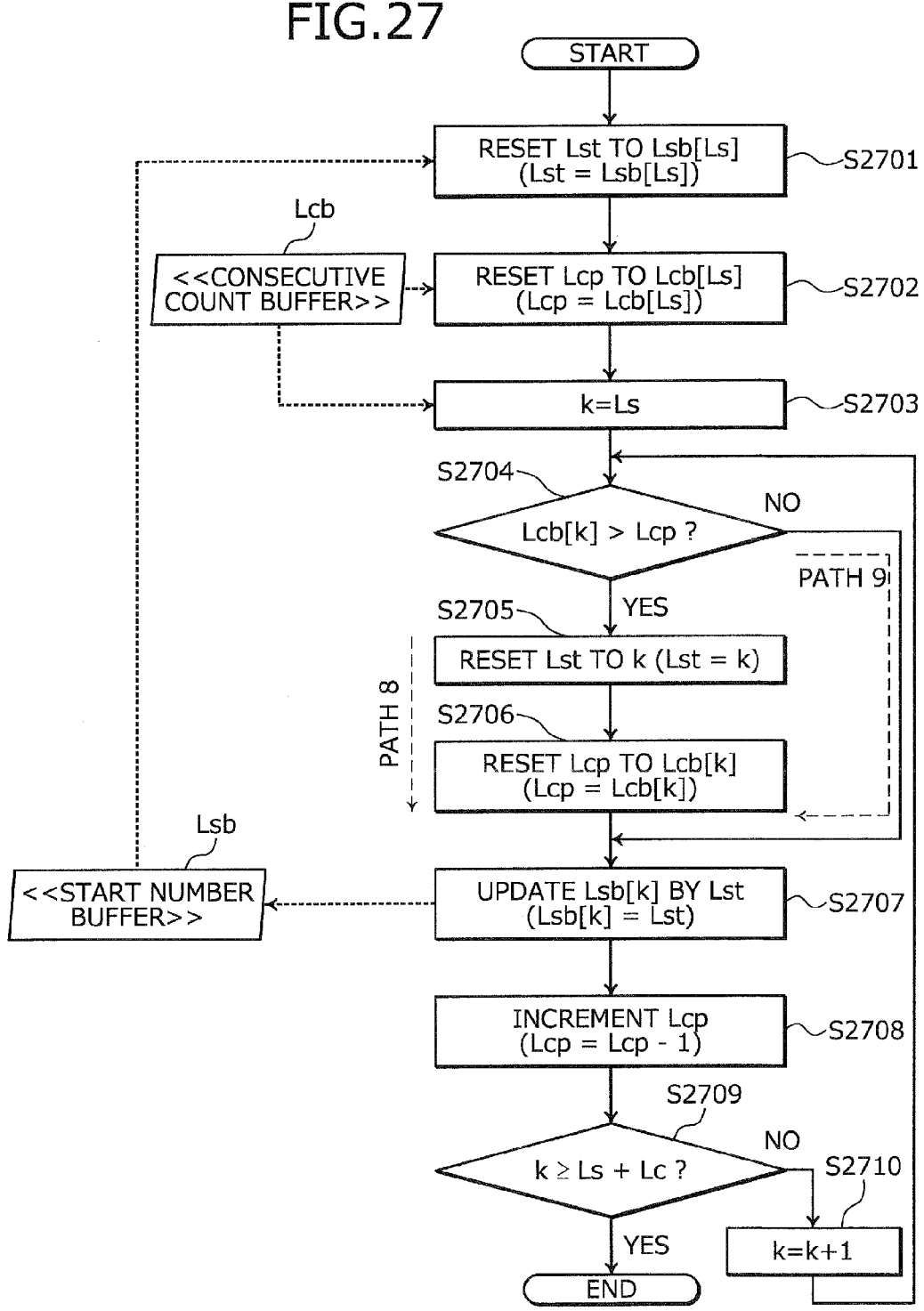
FIG. 27 is a flowchart of a procedure example of third updating processing.

FIG. 27 is a flowchart of a procedure example of third updating processing. The image processing apparatus 100, by the start number referring/updating unit 227, resets the line set start number temporary buffer Lst to the value of start number buffer Lsb[Ls] (step S2701). The image processing apparatus 100 sets Lst=Lsb[Ls].

The image processing apparatus 100, by the consecutive count comparing unit 226, resets the consecutive number previous value buffer Lcp to the value of consecutive count buffer Lcb[Ls] (step S2702). The image processing apparatus 100 sets Lcp=Lcb[Ls]. Then, the image processing apparatus 100 sets k=Ls (step S2703). The image processing apparatus 100, by the consecutive count comparing unit 226, judges whether Lcb[k]>Lcp is satisfied (step S2704). If it is judged that Lcb[k]>Lcp is not satisfied (step S2704: NO), the image processing apparatus 100 goes to step S2707. If it is judged that Lcb[k]>Lcp is satisfied (step S2704: YES), the image processing apparatus 100, by the start number referring/updating unit 227, resets the start number temporary buffer Lst to k ((step S2705). For example, the image processing apparatus 100 sets Lst=k.

The image processing apparatus 100, by the consecutive count comparing unit 226, resets the Lcp to Lcb[k] (step S2806). For example, the image processing apparatus 100 sets Lcp=Lcb[k]. The image processing apparatus 100, by the start number referring/updating unit 227, sets Lsb[k]=Lst (step S2707) The image processing apparatus 100 decrements the consecutive number previous value buffer Lcp (step S2708). The image processing apparatus 100, for example, sets Lcp=Lcp−1.

The image processing apparatus 100, by the consecutive count comparing unit 226, judges whether kLs+Lc is satisfied (step S2709). If it is judged that kLs+Lc is not satisfied (step S2709: NO), the image processing apparatus 100 sets k=k+1 (step S2710) and goes back to step S2704. If k≥Ls+Lc is satisfied (step S2709: YES), the image processing apparatus 100 ends a sequence of processing.

Figure 28:
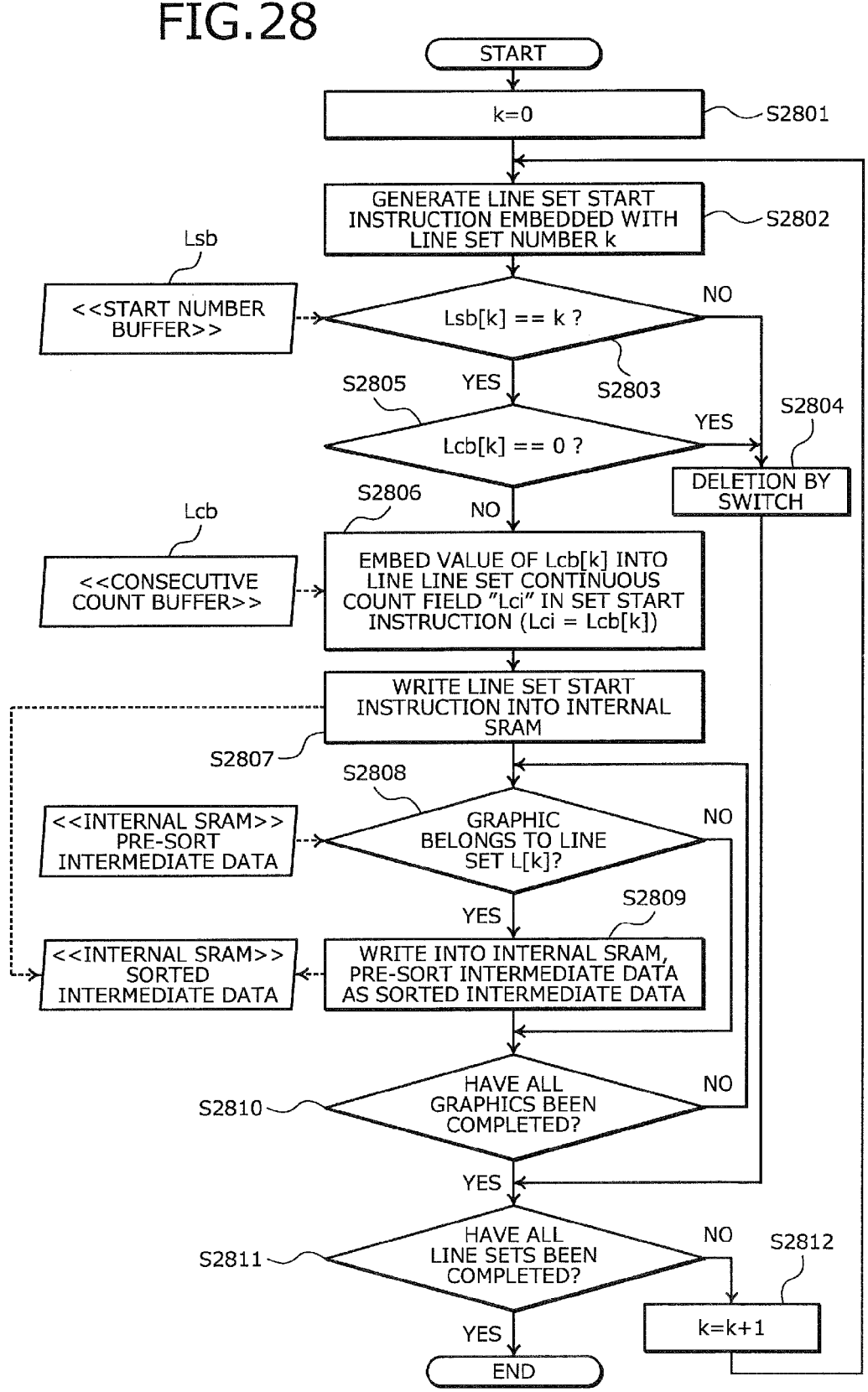
FIG. 28 is a flowchart of sort processing example 1.

FIG. 28 is a flowchart of sort processing example 1. Detailed sort processing at steps S2211 and S2212 described above is depicted. The image processing apparatus 100, by the drawing instruction sort executing unit 203, sets k=0 (step S2801). The image processing apparatus 100 generates the line set start instruction with the line set number k embedded therein (step S2802). The image processing apparatus 100, by the start number determining unit 233, judges whether Lsb[k]==k is satisfied (step S2803). If it is judged that Lsb[k]==k is not satisfied (step S2803: NO), the image processing apparatus 100, by the deleting switch 234, performs deletion (step S2804) and goes to step S2811.

If it is judged that Lsb[k]==k is satisfied (step S2803: YES), the image processing apparatus 100 judges whether Lcb[k]==0 is satisfied (step S2805). If Lcb[k]==0 is satisfied (step S2805: YES), the image processing apparatus 100 goes to step S2804. If Lcb[k]==0 is not satisfied (step S2805: NO), the image processing apparatus 100 embeds the value of the consecutive count buffer Lcb[k] into the consecutive line set count field Lci of the line set start instruction having the line set number k embedded therein. (step S2806).

The image processing apparatus 100 writes into the internal SRAM, the line set start instruction with the line set number k embedded therein (step S2807). The image processing apparatus 100 judges whether the given graphic among plural graphics belongs to line set L[k] (step S2808). The given graphic belonging to line set L[k] indicates that at least a part of the given graphic is drawn in line set L[k].

If it is judged that the given graphic belongs to line set L[k] (step S2808: YES), the image processing apparatus 100 writes the pre-sort intermediate data into the internal SRAM 201 as the sorted intermediate data (step S2809) and goes to step S2810. If it is judged that the given graphic does not belong to line set L[k] (step S2808: NO), the image processing apparatus 100 goes to step S2810.

The image processing apparatus 100 judges whether all graphics have become the given graphic to be subject to processing and the sorted intermediate data writing processing has finished (step S2810). If it is judged that the writing processing has not finished (step S2810: NO), the image processing apparatus 100 goes back to step S2808. If it is judged that the writing processing has finished (step S2810: YES), the image processing apparatus 100 judges whether all line sets L have become the given line set L and the sort processing has finished (step S2811). If it is judged that the sort processing has not finished (step S2811: NO), the image processing apparatus 100 sets k=k+1 (step S2812) and goes back to step S2802. If it is judged that the sort processing has finished (step S2811: YES), the image processing apparatus 100 finishes a sequence of processing.

Figure 29:
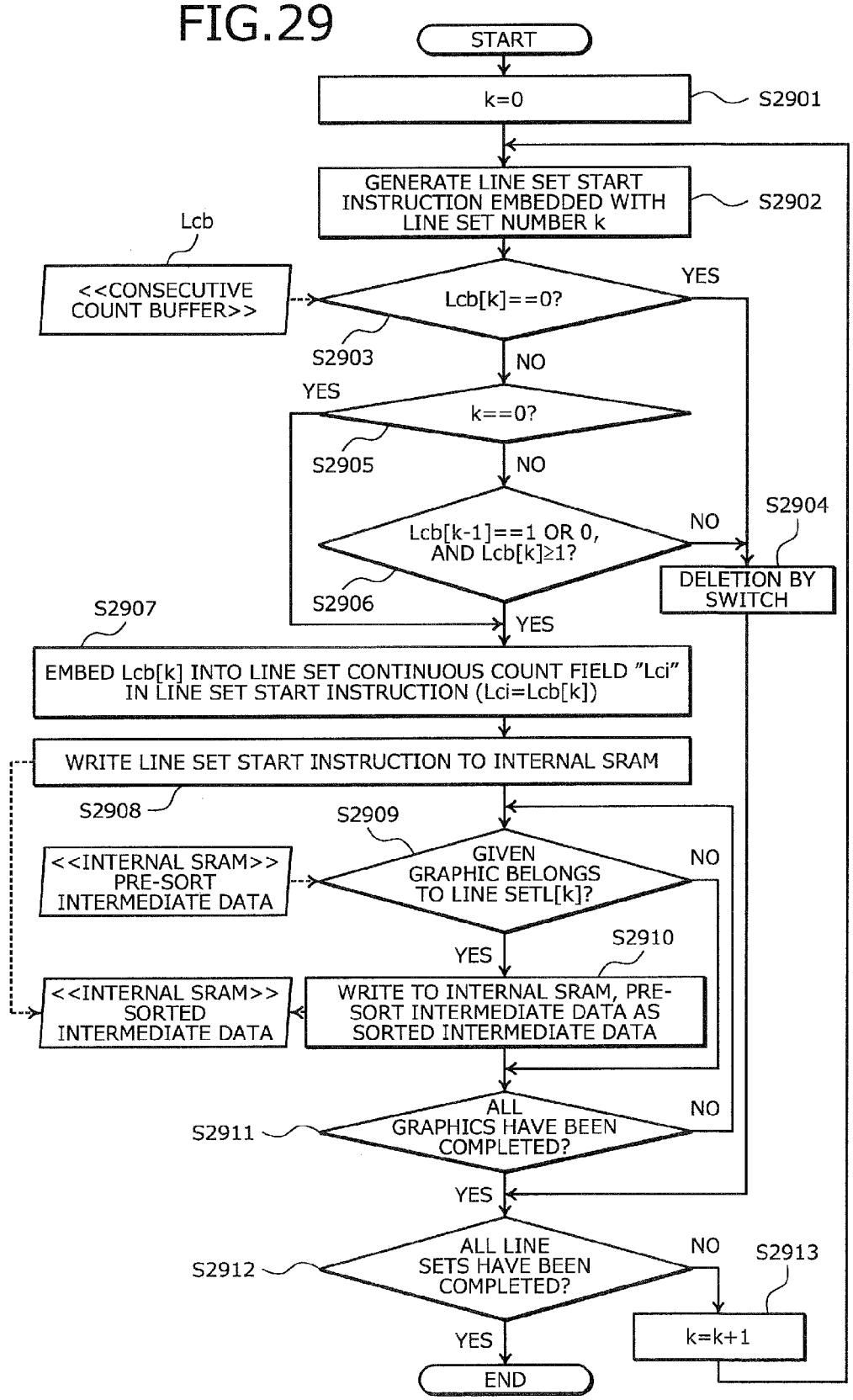
FIG. 29 is a flowchart of sort processing example 2.

FIG. 29 is a flowchart of sort processing example 2. Detailed sort processing at steps S2211 and S2212 described above is depicted. The image processing apparatus 100 sets k=0 (step S2901). The image processing apparatus 100 generates the line set start instruction with the line set number k embedded therein (step S2902). The image processing apparatus 100 judges whether Lcb[k]==0 is satisfied (step S2903).

If it is judged that Lcb[k]==0 is satisfied (step S2903: YES), the image processing apparatus 100, by the deleting switch 234, performs deletion of the pre-sorted intermediate data (step S2904). If it is judged that Lcb[k]==0 is not satisfied (step S2903: NO), the image processing apparatus 100 judges whether k==0 is satisfied (step S2905). If k==0 is satisfied (step S2905: YES), the image processing apparatus 100 goes to step S2907. If k==0 is not satisfied (step S2905: NO), the image processing apparatus 100 judges if Lcb[k−1]==1 or 0, and Lcb[k]≥1 is satisfied (step S2906). If Lcb[k−1]==1 or 0 is not satisfied, or Lcb[k]1 is not satisfied (step S2906: NO), the image processing apparatus 100 goes to step S2904.

If Lcb[k−1]==1 or 0 is satisfied and Lcb[k] 1 is satisfied (step S2906: YES), the image processing apparatus 100 embeds consecutive count buffer Lcb[k] in the consecutive line set count field Lci within the line set start instruction having the line set number k embedded therein (step S2907). For example, the image processing apparatus 100 sets Lci=Lcb[k].

The image processing apparatus 100 writes into the internal SRAM 201, the line set start instruction with the line set number k embedded therein (step S2908). The image processing apparatus 100 judges whether the given graphic belongs to line set L[k] (step S2909). If the given graphic belongs to line set L[k] (step S2909: YES), the image processing apparatus 100 writes the pre-sort intermediate data into the internal SRAM 201 as the sorted intermediate data (step S2910).

The image processing apparatus 100 judges whether all graphics have become the given graphic to be subject to processing and the sorted intermediate data writing processing has finished (step S2911). If it is judged that the writing processing has not finished (step S2911: NO), the image processing apparatus 100 goes back to step S2909. If it is judged that the writing processing has finished (step S2911: YES), the image processing apparatus 100 judges whether all line sets L have become the given line set L and the sort processing has finished (step S2912). If it is judged that the sort processing has not finished (step S2912: NO), the image processing apparatus 100 sets k=k+1 (step S2913) and goes back to step S2902. If it is judged that the sort processing has finished (step S2912: YES), the image processing apparatus 100 ends a sequence of processing.

Figure 30:
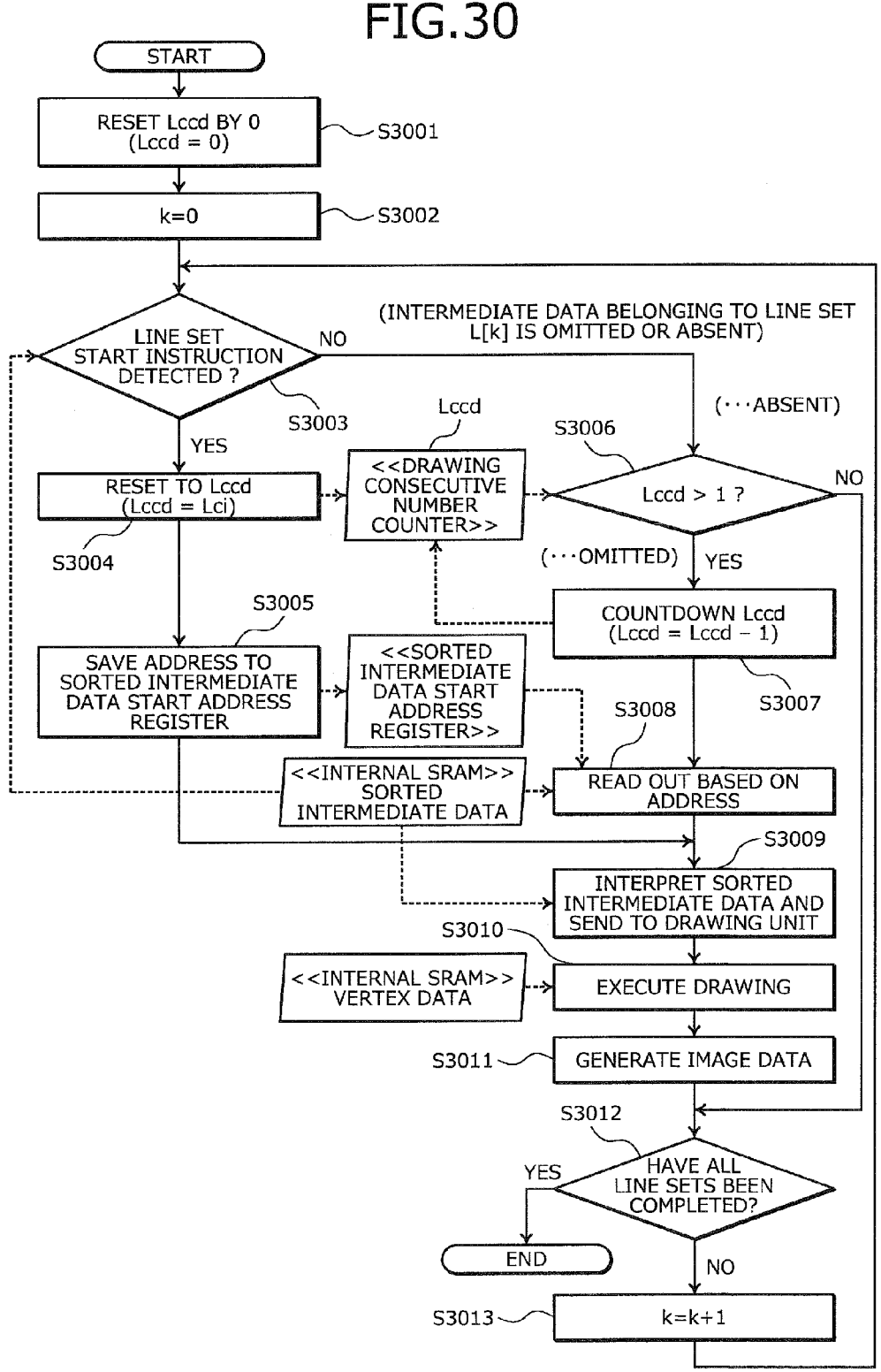
FIG. 30 is a flowchart of an image data generation processing example.

FIG. 30 is a flowchart of an image data generation processing example. Detailed image data generation processing at steps S2301 to S2308 described above will be described. The image processing apparatus 100, by the sorted intermediate data restoring unit 241, resets the drawing consecutive number counter Lccd by 0 (step S3001). The image processing apparatus 100 sets k=0 (step S3002). The image processing apparatus 100, by the sorted intermediate data restoring unit 241, judges whether the line set start instruction with the line set number k embedded therein has been detected (step S3003).

If it is judged that the line set start instruction has been detected (step S3003: YES), the image processing apparatus 100 reads out the embedded consecutive line set count Lci and sets the value to the drawing consecutive number counter Lccd (step S3004). For example, the image processing apparatus 100 sets Lccd=Lci. The image processing apparatus 100, by the consecutive number reading unit 244, saves the top address of the drawing instruction I to the sorted intermediate data start address register 245 (step S3005) and goes to step S3009.

On the other hand, if it is judged that the line set start instruction is not detected (step S3003: NO), the image processing apparatus 100, by the sorted intermediate data restoring unit 241, judges whether Lccd>1 is satisfied (step S3006). NO at step S3003 represents a case in which the intermediate data belonging to line set L[k] is omitted or absent. If it is judged that Lccd>1 is not satisfied (step S3006: NO), the image processing apparatus 100 goes to step S3012. If it is judged that Lccd>1 is satisfied (step S3006: YES), the image processing apparatus 100 counts down the drawing consecutive number counter Lccd (step S3007). For example, the image processing apparatus 100 sets Lccd=Lccd−1. In the case of YES at step S3006, the sorted intermediate data corresponding to the given line set L is omitted.

The image processing apparatus 100, by the sorted intermediate data restoring unit 246, reads out the sorted intermediate data from the internal SRAM 201, based on the address set in the sorted intermediate data start address register 245 (step S3008) and goes to step S3009.

The image processing apparatus 100, by the second drawing instruction decoder 242, interprets the sorted intermediate data and sends the data to the drawing unit 243 (step S3009). The image processing apparatus 100, by the drawing unit 243, executes the drawing (step S3010). The image processing apparatus 100 generates the image data (step S3011). Finally, the image processing apparatus 100 judges whether all line sets L have become the given line set and the image data generation processing has finished (step S3012). If it is judged that the data generation has not been completed with respect to a line set L (step S3012: NO), the image processing apparatus 100 sets k=k+1 (step S3013) and goes back to step S3003. If it is judged that the data generation has been completed with respect to all line sets L (step S3012: YES), the image processing apparatus 100 ends a sequence of processing.

Figure 31:
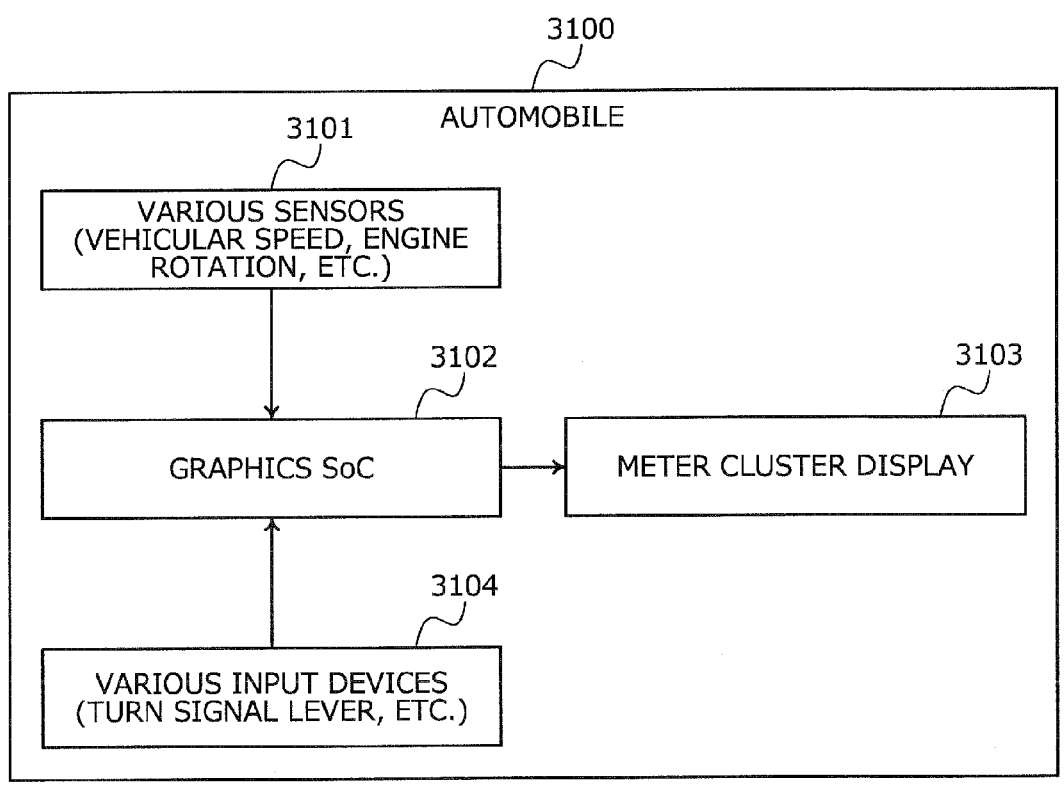
FIG. 31 is an explanatory diagram of a system example using the image processing apparatus.

FIG. 31 is an explanatory diagram of a system example using the image processing apparatus. An automobile is given as a system 3100. The system 3100 has various sensors 3101, a graphics system-on-chip (SoC) 3102, a meter cluster display 3103, and various input devices 3104. The various sensors 3101 check vehicular speed, the engine rotation, etc. The graphics SoC 3102 is a dedicated processor having the image processing apparatus 100. The graphics SoC 3102 generates the image data, by line set L, to be displayed on the meter cluster display 3103. The various input devices 3104 are such devices as a turn indicator lever. For example, the graphics SoC 3102 may have, for example, the CPU 251, the GPU 252, the ROM 253, the disk drive 255, the disk 256, etc., depicted in FIG. 2A.

The system using the image processing apparatus may be a device with a display such as a personal computer (PC), a TV set, and a portable terminal device or may be a printer, etc.

As described above, the image processing apparatus 100 according to this embodiment classifies the partitioned areas into groups for each combination of the graphics to be drawn and stores to the storage unit, the drawing instruction I for each group. This makes it possible to reduce the drawing instructions to be stored for generation of the image data, for each partitioned area. For example, the storage unit as a storing destination may be memory external to the image processing apparatus 100 or may be internal memory. In the case of external memory, with the reduction of the drawing instructions to be stored, the occurrence of contention between the image processing apparatus 100 and other devices can be suppressed at the storage area. In the case of internal memory, since the amount of memory is limited, the processing by the image processing apparatus 100 is complicated for bringing the amount of data to be stored to be within the limitation. Therefore, the accuracy of the image data and the accuracy of the intermediate data may drop. In contrast, as described above, according to the image processing apparatus 100 of this embodiment, the reduction of the drawing instruction to be stored can be achieved and therefore, drops in data accuracy can be suppressed.

The image processing apparatus 100 classifies into the same group, the partitioned areas that are consecutive in the order of generation of the image data in the image data generation processing and in which, among plural graphics, the graphic at least a part of which is drawn is the same. Thus, since the partitioned areas are grouped in order of generation, the same drawing instruction is used continuously and the control of using the same drawing instruction repeatedly can be made easier.

The area information, which indicates the partitioned areas classified into a group, is expressed by the area information that indicates the partitioned area at the top or the end in order of generation, among the partitioned areas classified into the group, and the information that indicates the number of partitioned areas classified into the group. Thus, by causing the drawing instructions to have a same bit width, reduction of the drawing instructions to be stored can be achieved.

The image processing apparatus 100, for each of the classified groups, identifies in the storage unit, the drawing instruction I stored for the group, and generates the image data with respect to each of the partitioned areas classified into the group. Consequently, since the image data can be generated by merely searching the storage unit one time for each group, the time required for searching can be shortened.

The image processing apparatus 100 stores to the second storage unit, the address that indicates the storage area in which the identified drawing instruction I is stored. The image processing apparatus 100 generates the image data with respect to each of the partitioned areas classified into the group, based on the drawing instruction I stored in the storage area indicated by the address stored in the second storage unit. Thus, by storing to a register, the address of the storage area in which the identified drawing instruction I is stored, without having the register for storing the identified drawing instruction I, the identification of the drawing instruction I from the storage unit is made easier and the time required for the identification can be shortened.

The size of each of the plural partitioned areas is the size of the line buffer. Therefore, at the time of preparing the image data for each partitioned area, if the size of the partitioned area is the same as that of the line buffer, the image data generated with respect to the partitioned area can be stored directly in the line buffer.

The image processing method described in this embodiment can be implemented by executing a preliminarily prepared image processing program on a computer such as a personal computer and a workstation. The image processing program is recorded on a computer-readable recording medium such as a magnetic disk, an optical disk, and universal serial bus (USB) flash memory and is executed by being read out from the recording medium by the computer. The image processing program may be distributed by way of the network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing method executed by an image processing apparatus, the image processing method comprising:
acquiring, for a graphic among a plurality of graphics to be drawn in a drawing area, a drawing instruction to draw the graphic in the drawing area and area information indicating a partitioned area among a plurality of partitioned areas into which the drawing area is divided, the partitioned area indicated by the acquired area information being a partitioned area in which at least a part of the graphic is drawn;
classifying each partitioned area indicated by the acquired area information such that the partitioned areas including a same combination of graphics at least a part of which are drawn among the plurality of graphics are classified into a same group;
correlating and storing a first area information and a first drawing instruction to a first storage unit with respect to each classified group, the first area information being the area information indicating the partitioned areas classified into the group, the first drawing instruction being the drawing instruction acquired for the graphic at least a part of which is drawn in the partitioned areas classified into the group; and
generating image data indicating each pixel within the partitioned area, for each partitioned area indicated by the acquired area information, based on the drawing instruction correlated with the area information indicating the partitioned area and stored in the first storage unit.

2. The image processing method according to claim 1, wherein
the classifying includes classifying such that the partitioned areas that are consecutive in order of generation of the image data at the generating and in which at least a part of a same graphic among the plurality of graphics is drawn are classified into a same group.

3. The image processing method according to claim 2, wherein
the area information indicating the partitioned areas classified into the group is expressed by the area information indicating the partitioned area at a top or an end in the order of generation among the partitioned areas classified into the group, and information indicating a count of the partitioned areas classified into the group.

4. The image processing method according to claim 1, wherein
the generating includes:
identifying the drawing instruction stored in the first storage unit for the each classified group; and
generating the image data for each of the partitioned areas classified into the classified group based on the identified drawing instruction.

5. The image processing method according to claim 4, wherein
the generating includes:
storing to a second storage unit, an address indicating a storage area storing the identified drawing instruction in the first storage unit; and
generating the image data for each of the partitioned areas classified into the group, based on the drawing instruction stored in the storage area indicated by the address stored in the second storage unit.

6. The image processing method according to claim 1, wherein
each partitioned area among the plurality of partitioned areas is of a size equivalent to a size of a line buffer.

7. An image processing apparatus comprising:
a processor configured to:
acquire, for a graphic among a plurality of graphics to be drawn in a drawing area, a drawing instruction to draw the graphic in the drawing area and area information indicating a partitioned area among a plurality of partitioned areas into which the drawing area is divided, the partitioned area indicated by the acquired area information being a partitioned area in which at least a part of the graphic is drawn;
classify each partitioned area indicated by the acquired area information such that the partitioned areas including a same combination of graphics at least a part of which are drawn among the plurality of graphics are classified into a same group;
correlate and store a first area information and a first drawing instruction to a first storage unit with respect to each classified group, the first area information being the area information indicating the partitioned areas classified into the group, the first drawing instruction being the drawing instruction acquired for the graphic at least a part of which is drawn in the partitioned areas classified into the group; and
generate image data indicating each pixel within the partitioned area, for each partitioned area indicated by the acquired area information, based on the drawing instruction correlated with the area information indicating the partitioned area and stored in the first storage unit.

* * * * *